United States Patent
Maehata et al.

(10) Patent No.: US 8,864,620 B2
(45) Date of Patent: Oct. 21, 2014

(54) ROTARY BODY DRIVER WITH PLANETARY GEAR TRANSMISSION AND IMAGE FORMING APPARATUS INCORPORATING SAME

(71) Applicants: Yasuhiro Maehata, Tokyo (JP); Katsuaki Miyawaki, Kanagawa (JP); Hiromichi Matsuda, Kanagawa (JP); Tetsuo Watanabe, Kanagawa (JP); Nobuo Iwata, Kanagawa (JP); Keisuke Shimizu, Tokyo (JP)

(72) Inventors: Yasuhiro Maehata, Tokyo (JP); Katsuaki Miyawaki, Kanagawa (JP); Hiromichi Matsuda, Kanagawa (JP); Tetsuo Watanabe, Kanagawa (JP); Nobuo Iwata, Kanagawa (JP); Keisuke Shimizu, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 128 days.

(21) Appl. No.: 13/644,721

(22) Filed: Oct. 4, 2012

(65) Prior Publication Data
US 2013/0109529 A1    May 2, 2013

(30) Foreign Application Priority Data

Nov. 2, 2011 (JP) .................................. 2011-241553
Mar. 6, 2012 (JP) .................................. 2012-048874
May 21, 2012 (JP) .................................. 2012-115266

(51) Int. Cl.
*F16H 57/08*    (2006.01)
*G03G 15/00*    (2006.01)
*F16H 1/28*    (2006.01)
*F16H 55/17*    (2006.01)
*F16H 55/06*    (2006.01)

(52) U.S. Cl.
CPC ............. *F16H 1/2818* (2013.01); *G03G 15/757* (2013.01); *F16H 1/2827* (2013.01); *F16H 2055/176* (2013.01); *F16H 57/082* (2013.01); *F16H 55/06* (2013.01); *Y10S 475/901* (2013.01); *Y10S 475/902* (2013.01)
USPC .......................... 475/331; 475/901; 475/902

(58) Field of Classification Search
USPC ......................................... 475/331, 901, 902
See application file for complete search history.

(56) References Cited

U.S. PATENT DOCUMENTS

| | | | | |
|---|---|---|---|---|
| 5,074,832 A | * | 12/1991 | Igaku | 475/317 |
| 5,269,733 A | * | 12/1993 | Anthony, III | 475/331 |
| 5,689,764 A | | 11/1997 | Fukuchi et al. | |
| 7,294,080 B2 | * | 11/2007 | Hoshino | 475/149 |

(Continued)

FOREIGN PATENT DOCUMENTS

| | | |
|---|---|---|
| JP | 8-320604 | 12/1996 |
| JP | 10-240069 | 9/1998 |
| JP | 2001-330087 | 11/2001 |

(Continued)

*Primary Examiner* — Tisha Lewis
(74) *Attorney, Agent, or Firm* — Oblon, Spivak, McClelland, Maier & Neustadt, L.L.P.

(57) ABSTRACT

A rotary body driver includes a driving source and a planetary gear transmission to receive a driving force from the driving source. The planetary gear transmission includes a sun gear rotatable by the driving force received from the driving source, a plurality of planet gears meshed with and surrounding the sun gear with an identical interval between the adjacent planet gears, a rotatable carrier to rotatably support the plurality of planet gears, an outer gear encircling and meshed with the plurality of planet gears, and an output shaft combined with and supporting the carrier. A rotary body shaft mounting a rotary body is connected to the output shaft of the planetary gear transmission to transmit the driving force received from the output shaft to the rotary body. The outer gear is made of resin and the output shaft and the carrier are made of metal.

14 Claims, 11 Drawing Sheets

(56) References Cited

U.S. PATENT DOCUMENTS

| | | |
|---|---|---|
| 2008/0145102 A1 | 6/2008 | Katoh et al. |
| 2009/0017953 A1* | 1/2009 | Uehara et al. ................. 475/149 |
| 2010/0105980 A1* | 4/2010 | Shimizu et al. ............... 600/101 |
| 2011/0230305 A1* | 9/2011 | Miyawaki et al. ............ 475/331 |
| 2011/0293328 A1* | 12/2011 | Matsuda et al. .............. 399/167 |
| 2012/0046142 A1* | 2/2012 | Miyawaki et al. ............ 475/331 |
| 2012/0196720 A1* | 8/2012 | Miyawaki et al. ............ 475/345 |

FOREIGN PATENT DOCUMENTS

| | | |
|---|---|---|
| JP | 2002-078290 | 3/2002 |
| JP | 2008-151868 | 7/2008 |
| JP | 2008-190681 | 8/2008 |
| JP | 2011197298 A * | 10/2011 |

* cited by examiner

AXIAL DIRECTION
OF OUTPUT SHAFT

ROTARY BODY DRIVER WITH PLANETARY GEAR TRANSMISSION AND IMAGE FORMING APPARATUS INCORPORATING SAME

CROSS-REFERENCE TO RELATED APPLICATIONS

This patent application is based on and claims priority pursuant to 35 U.S.C. §119 to Japanese Patent Application Nos. 2011-241553, filed on Nov. 2, 2011, 2012-048874, filed on Mar. 6, 2012, and 2012-115266, filed on May 21, 2012, in the Japanese Patent Office, the entire disclosure of each of which is hereby incorporated by reference herein.

BACKGROUND OF THE INVENTION

1. Field of the Invention

Exemplary aspects of the present invention relate to a rotary body driver and an image forming apparatus, and more particularly, to a rotary body driver for driving a rotary body and an image forming apparatus incorporating the rotary body driver.

2. Description of the Related Art

Related-art image forming apparatuses, such as copiers, facsimile machines, printers, or multifunction printers having at least one of copying, printing, scanning, and facsimile functions, typically form an image on a recording medium according to image data. Thus, for example, a charger uniformly charges a surface of a photoconductor; an optical writer emits a light beam onto the charged surface of the photoconductor to form an electrostatic latent image on the photoconductor according to the image data; a development device supplies toner to the electrostatic latent image formed on the photoconductor to render the electrostatic latent image visible as a toner image; the toner image is directly transferred from the photoconductor onto a recording medium or is indirectly transferred from the photoconductor onto a recording medium via an intermediate transfer belt; finally, a fixing device applies heat and pressure to the recording medium bearing the toner image to fix the toner image on the recording medium, thus forming the image on the recording medium.

Since the electrostatic latent image and the resultant toner image are formed on the photoconductor as it rotates and the toner image is transferred from the photoconductor onto the intermediate transfer belt as they rotate, the photoconductor and the intermediate transfer belt are required to rotate at a precise, predetermined rotation speed. Otherwise, a faulty toner image, such as a jittered image or a banded image, is formed due to variation in the rotation speed of the photoconductor and the intermediate transfer belt (hereinafter referred to as a rotary body).

To address this requirement, a rotary body driver employing a planetary gear transmission is proposed to drive and rotate the rotary body at a predetermined rotation speed precisely. For example, the planetary gear transmission is connected to a motor and a tubular rotary body to transmit a driving force generated by the motor to the rotary body. Specifically, the planetary gear transmission includes a sun gear coaxially connected to an output shaft of the motor. A plurality of planet gears rotatably supported by a carrier surrounds the sun gear in such a manner that the planet gears are meshed with the sun gear and an outer gear encircling the planet gears.

As the motor rotates, a driving force of the motor is transmitted to the sun gear. Accordingly, the planet gears meshed with the sun gear and the outer gear rotate and at the same time revolve about the sun gear. Consequently, the carrier supporting the planet gears revolves about the sun gear, rotating the rotary body coaxially connected to the carrier. That is, the carrier serves as an output shaft of the planetary gear transmission and a rotary body shaft of the rotary body, thus transmitting the driving force to the rotary body. The planetary gear transmission transmits the driving force generated by the motor rotating at a predetermined rotation speed range with minimized speed variation by speed reduction gearing at an increased reduction ratio, thus minimizing variation in the rotation speed of the rotary body.

At the same time, there is a growing demand for industrial products that save resources, i.e., are lightweight, use fewer, more durable parts that are recyclable, and consume less energy during manufacture and operation.

In order to meet such demand, the rotary body driver should be lightweight as well. For example, if all the major components of the planetary gear transmission of the rotary body driver are made of metal, the weight of the planetary gear transmission may increase. Conversely, if all the major components of the planetary gear transmission are made of resin, the weight of the planetary gear transmission may decrease. However, since resin has load duration smaller than that of metal, the resin carrier of the planetary gear transmission that transmits the driving force from the motor to the rotary body may not endure against load imposed by the rotary body and may be subject to breakage.

Accordingly, there is a need for a rotary body driver that is both lightweight and durable against load.

SUMMARY OF THE INVENTION

This specification describes below an improved rotary body driver for driving a rotary body. In one exemplary embodiment of the present invention, the rotary body driver includes a driving source to generate a driving force and a planetary gear transmission connected to the driving source to receive the driving force therefrom. The planetary gear transmission includes a sun gear rotatable by the driving force received from the driving source; a plurality of planet gears meshed with and surrounding the sun gear with an identical interval between the adjacent planet gears; a rotatable carrier to rotatably support the plurality of planet gears; an outer gear encircling and meshed with the plurality of planet gears; and an output shaft combined with and supporting the carrier. A rotary body shaft mounting the rotary body is connected to the output shaft of the planetary gear transmission to transmit the driving force received from the output shaft to the rotary body. The outer gear is made of resin and the output shaft and the carrier are made of metal.

This specification further describes an improved image forming apparatus. In one exemplary embodiment of the present invention, the image forming apparatus includes the rotary body driver described above.

BRIEF DESCRIPTION OF THE DRAWINGS

A more complete appreciation of the invention and the many attendant advantages thereof will be readily obtained as the same becomes better understood by reference to the following detailed description when considered in connection with the accompanying drawings, wherein.

DETAILED DESCRIPTION OF THE INVENTION

Figure 1:
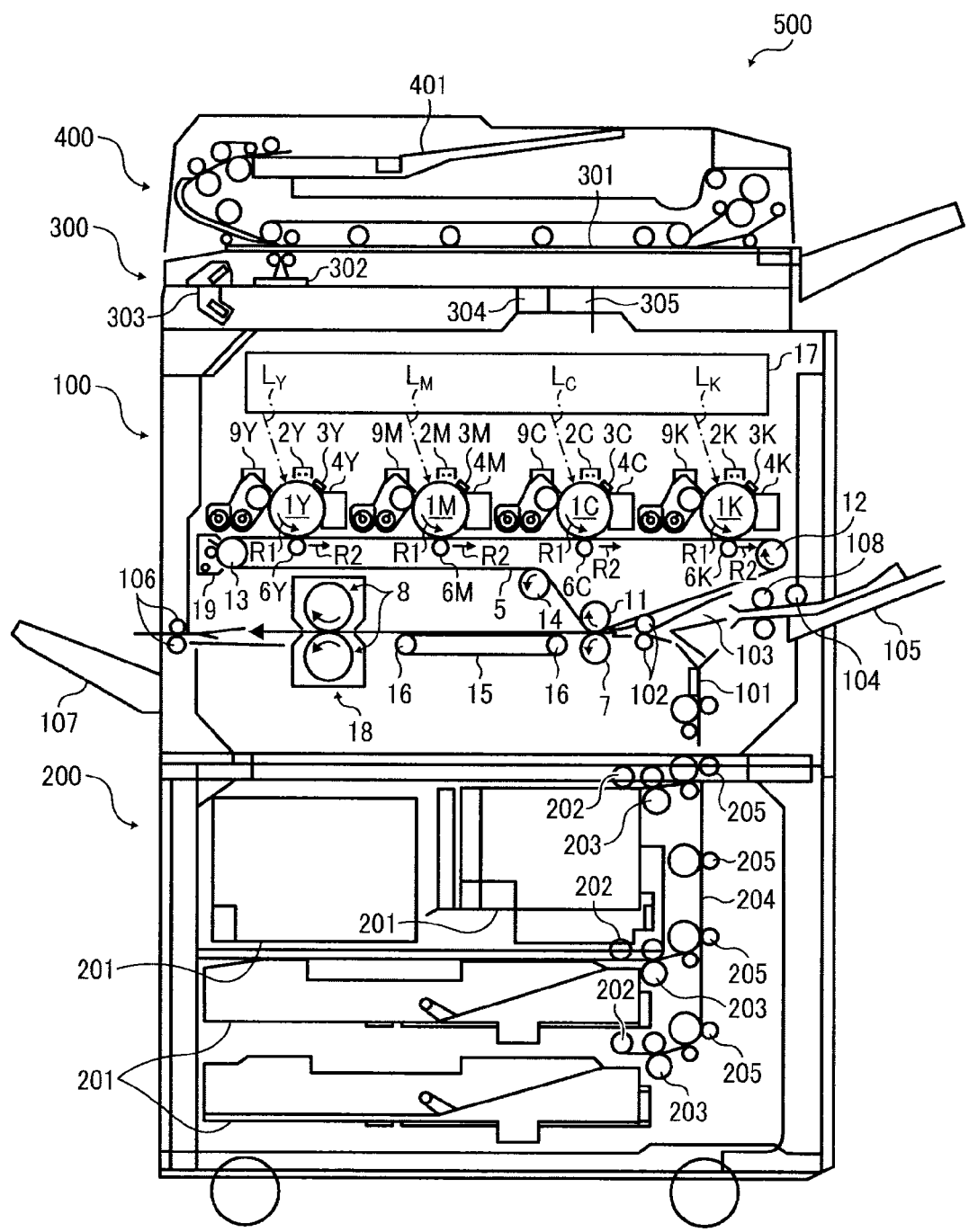
FIG. 1 is a schematic vertical sectional view of an image forming apparatus according to an exemplary embodiment of the present invention.

In describing exemplary embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views, in particular to FIG. 1, an image forming apparatus 500 according to an exemplary embodiment of the present invention is explained.

FIG. 1 is a schematic vertical sectional view of the image forming apparatus 500. The image forming apparatus 500 may be a copier, a facsimile machine, a printer, a multifunction printer (MFP) having at least one of copying, printing, scanning, plotter, and facsimile functions, or the like. According to this exemplary embodiment, the image forming apparatus 500 is an MFP for forming color and monochrome toner images on recording media by electrophotography.

The image forming apparatus 500 is a tandem image forming apparatus that forms a toner image by using dry two-component developer containing toner and carrier particles. The image forming apparatus 500 is constructed of a sheet storage 200, a body 100 placed on the sheet storage 200, a scanner 300 placed on the body 100, and an auto document feeder (ADF) 400 placed on the scanner 300. The image forming apparatus 500 forms a toner image on a recording medium according to image data created by the scanner 300 that reads an image on an original document or image data sent from an external device such as a client computer. The body 100 includes four tubular photoconductors 1Y, 1M, 1C, and 1K (e.g., photoconductive drums) aligned substantially horizontally and serving as electrostatic latent image carriers that carry electrostatic latent images to be visualized into yellow, magenta, cyan, and black toner images, respectively. The photoconductors 1Y, 1M, 1C, and 1K also serve as rotary bodies. The photoconductors 1Y, 1M, 1C, and 1K contact an endless intermediate transfer belt 5 stretched over a plurality of rotatable rollers including a driving roller, thus aligned along a rotation direction R2 of the intermediate transfer belt 5.

The photoconductors 1Y, 1M, 1C, and 1K are surrounded by electrophotographic process components, that is, chargers 2Y, 2M, 2C, and 2K, development devices 9Y, 9M, 9C, and 9K containing yellow, magenta, cyan, and black toners, cleaners 4Y, 4M, 4C, and 4K, and discharging lamps 3Y, 3M, 3C, and 3K, respectively. These electrophotographic process components are aligned along a circumferential direction of the photoconductors 1Y, 1M, 1C, and 1K in an order of electrophotographic processes performed thereon, that is, a charging process, a development process, a cleaning process, and a discharging process. Above the photoconductors 1Y, 1M, 1C, and 1K is an optical writer 17.

The photoconductors 1Y, 1M, 1C, and 1K are disposed opposite primary transfer rollers 6Y, 6M, 6C, and 6K, serving as primary transferors, respectively, via the intermediate transfer belt 5.

The intermediate transfer belt 5 is looped over support rollers 11, 12, and 13 and a tension roller 14. As a driver drives and rotates the support roller 12 serving as a driving roller, the support roller 12 rotates the intermediate transfer belt 5 in the rotation direction R2 by friction therebetween. A belt cleaner 19, disposed opposite the support roller 13 via the intermediate transfer belt 5, removes residual toner remaining on the intermediate transfer belt 5 after a secondary transfer process for transferring a toner image from the intermediate transfer belt 5 onto a recording medium. The support roller 11 is a secondary transfer opposed roller disposed opposite a secondary transfer roller 7 serving as a secondary transferor. The support roller 11 presses against the secondary transfer roller 7 via the intermediate transfer belt 5 to form a secondary transfer nip between the intermediate transfer belt 5 and the secondary transfer roller 7.

Downstream from the secondary transfer nip in a recording medium conveyance direction is a conveyance belt 15 stretched over two support rollers 16. The conveyance belt 15 conveys the recording medium bearing the toner image to a fixing device 18. The fixing device 18 includes a pair of fixing rollers 8 pressed against each other to form a fixing nip therebetween. As the recording medium bearing the toner image is conveyed through the fixing nip, the pair of fixing rollers 8 applies heat and pressure to the recording medium, fixing the toner image on the recording medium.

With reference to FIG. 1, a description is provided of a copying operation of the image forming apparatus 500 having the structure described above to form a color toner image on a recording medium.

As a user places an original document on an original document tray 401 of the ADF 400 and presses a start button on a control panel disposed atop the scanner 300, the ADF 400 feeds the original document onto an exposure glass 301 of the scanner 300 and the scanner 300 starts scanning an image on the original document. Alternatively, as the user lifts the ADF 400, places an original document on the exposure glass 301, lowers the ADF 400 to press the original document against the exposure glass 301, and presses the start button on the control panel, the scanner 300 starts scanning an image on the original document. For example, as a first carriage 302 and a second carriage 303 of the scanner 300 move, the first carriage 302 emits light onto the original document placed on the exposure glass 301. The light reflected by the original document is further reflected by a mirror mounted on the second carriage 303, entering a reading sensor 305 through an image forming lens 304. Thus, the scanner 300 produces image data and sends it to the optical writer 17.

On the other hand, as the user presses the start button on the control panel, a motor is driven, thus driving and rotating the support roller 12 serving as a driving roller that drives and rotates the intermediate transfer belt 5 clockwise in FIG. 1 in the rotation direction R2. Simultaneously, as a photoconductor driver described below drives and rotates the photoconductor 1Y counterclockwise in FIG. 1 in a rotation direction R1, the charger 2Y uniformly charges the photoconductor 1Y. Thereafter, the optical writer 17 emits a laser beam Ly onto the charged photoconductor 1Y according to the image data sent from the scanner 300, thus forming an electrostatic latent image for yellow on the photoconductor 1Y. The development device 9Y visualizes the electrostatic latent image into a yellow toner image with yellow toner contained in the developer. Specifically, as a predetermined development bias is applied between the photoconductor 1Y and an opposed development roller of the development device 9Y, yellow toner carried on the development roller is electrostatically attracted to the electrostatic latent image formed on the photoconductor 1Y, thus forming the yellow toner image on the photoconductor 1Y.

The yellow toner image formed on the photoconductor 1Y, as the photoconductor 1Y rotates in the rotation direction R1, is conveyed to a primary transfer nip formed between the photoconductor 1Y and the intermediate transfer belt 5. At the primary transfer nip, the primary transfer roller 6Y applies a predetermined bias voltage to an inner circumferential surface of the intermediate transfer belt 5, creating a primary transfer electric field. The primary transfer electric field attracts the yellow toner image formed on the photoconductor 1Y to the intermediate transfer belt 5, thus primarily transferring the yellow toner image onto an outer circumferential surface of the intermediate transfer belt 5. Similarly, magenta, cyan, and black toner images are formed on the photoconductors 1M, 1C, and 1K, respectively, and primarily transferred onto the intermediate transfer belt 5 successively in such a manner that the magenta, cyan, and black toner images are superimposed on the yellow toner image on the intermediate transfer belt 5. Thus, a color toner image is formed on the intermediate transfer belt 5.

On the other hand, the sheet storage 200 includes a plurality of paper trays 201 that loads recording media (e.g., transfer sheets) of different sizes, respectively. As the user presses the start button on the control panel, a pickup roller 202 of the sheet storage 200 corresponding to the paper tray 201 that loads recording media of the size selected by the user rotates and picks up recording media from the selected paper tray 201. A separation roller 203 separates an uppermost recording medium from other recording media and conveys the uppermost recording medium toward a conveyance path 204. Conveyance rollers 205 situated in the conveyance path 204 convey the uppermost recording medium toward a conveyance path 101 inside the body 100. As the recording medium strikes a registration roller pair 102, the registration roller pair 102 halts the recording medium temporarily.

Alternatively, a recording medium may be supplied to the registration roller pair 102 from a bypass tray 105 mounted on a right side in FIG. 1 of the body 100. In this case, a pickup roller 104 picks up and feeds recording media loaded on the bypass tray 105 toward a separation roller 108. The separation roller 108 separates an uppermost recording medium from other recording media and feeds the uppermost recording medium toward a bypass conveyance path 103. As the recording medium strikes the registration roller pair 102, the registration roller pair 102 halts the recording medium temporarily.

As the intermediate transfer belt 5 rotates in the rotation direction R2, the color toner image formed on the intermediate transfer belt 5 is conveyed to the secondary transfer nip formed between the intermediate transfer belt 5 and the secondary transfer roller 7. At a time when the color toner image formed on the intermediate transfer belt 5 reaches the secondary transfer nip, the registration roller pair 102 starts rotating to convey the recording medium toward the secondary transfer nip. At the secondary transfer nip, the secondary transfer roller 7 applies a predetermined bias voltage to a back side of the recording medium, creating a secondary transfer electric field. Thus, the secondary transfer electric field and pressure exerted to the recording medium at the secondary transfer nip secondarily transfer the color toner image from the intermediate transfer belt 5 onto a front side of the recording medium. After the secondary transfer, the belt cleaner 19 removes residual toner not transferred onto the recording medium and therefore remaining on the intermediate transfer belt 5 therefrom.

Thereafter, the recording medium bearing the color toner image is conveyed by the conveyance belt 15 toward the fixing device 18 where the pair of fixing rollers 8 fixes the toner image on the recording medium. The recording medium bearing the fixed toner image is conveyed to an output roller pair 106 that discharges the recording medium onto an output tray 107 mounted on a left side of the body 100.

A description is provided of a configuration of a photoconductor driver installed in the body 100 of the image forming apparatus 500 described above.

The photoconductor driver serves as a rotary body driver that drives and rotates the photoconductors 1Y, 1M, 1C, and 1K serving as a rotary body. The photoconductor driver is provided for each of the photoconductors 1Y, 1M, 1C, and 1K (hereinafter referred to as a photoconductor 1). Hence, four photoconductor drivers having an identical structure are installed in the body 100 of the image forming apparatus 500. The configuration of the photoconductor driver is also applicable to a support roller driver that drives and rotates the support roller 12 that drives and rotates the intermediate transfer belt 5, a secondary transfer roller driver that drives and rotates the secondary transfer roller 7, a fixing roller driver that drives and rotates the pair of fixing rollers 8, and other driver that drives and rotates a roller or other rotary body.

With reference to FIGS. 2 to 5, a description is provided of a configuration of a photoconductor driver 10 according to a first exemplary embodiment that is installed in the body 100 of the image forming apparatus 500 described above.

Figure 2:
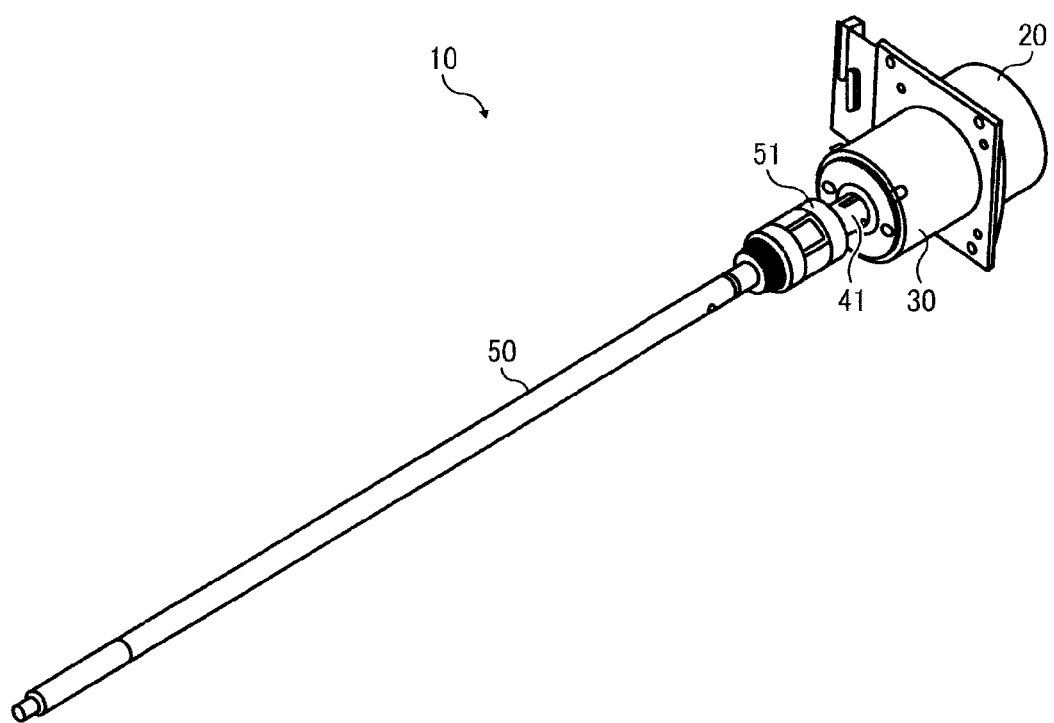
FIG. 2 is a perspective view of a photoconductor driver according to a first exemplary embodiment installed in the image forming apparatus shown in FIG. 1.
Figure 3:
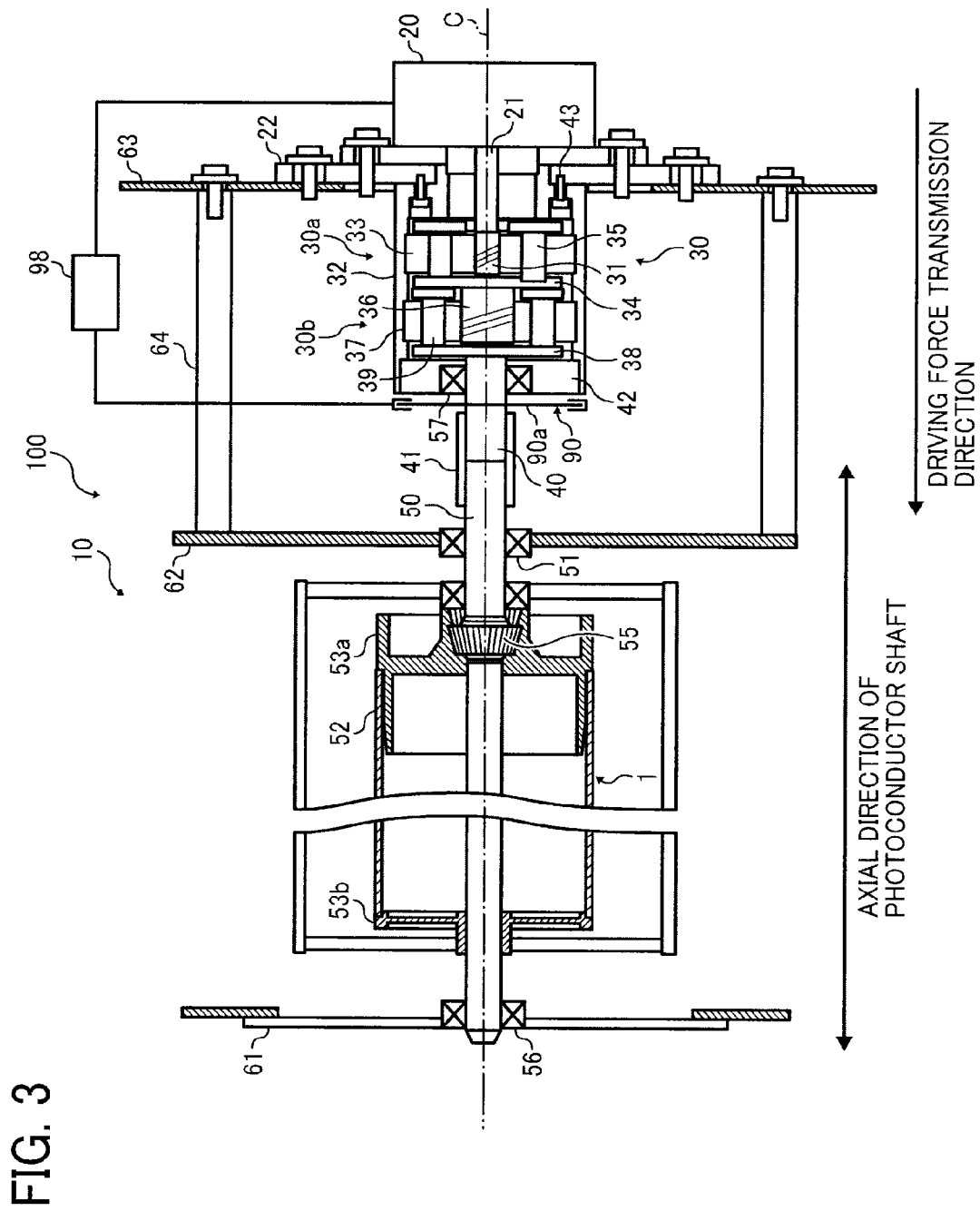
FIG. 3 is a vertical sectional view of the photoconductor driver shown in FIG. 2.
Figure 4:
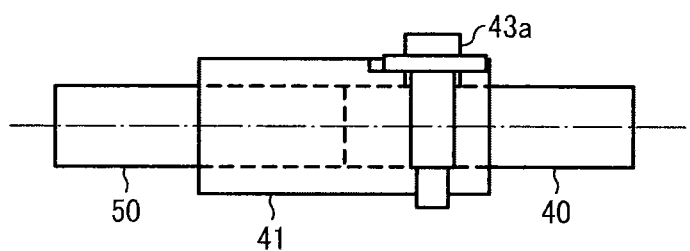
FIG. 4 is a vertical sectional view of a joint installed in the photoconductor driver shown in FIG. 3.
Figure 5:
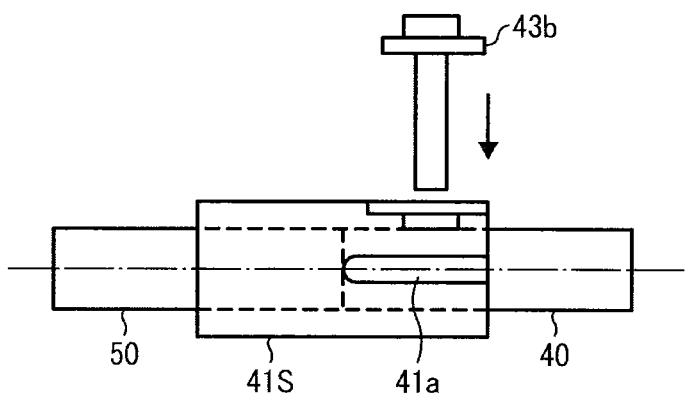
FIG. 5 is a vertical sectional view of a joint installable in the photoconductor driver shown in FIG. 3 as a variation of the joint shown in FIG. 4.

FIG. 2 is a perspective view of the photoconductor driver 10. FIG. 3 is a vertical sectional view of the photoconductor driver 10. FIG. 4 is a vertical sectional view of a joint 41 installed in the photoconductor driver 10. FIG. 5 is a vertical sectional view of a joint 41S installable in the photoconductor driver 10 as a variation of the joint 41.

As shown in FIG. 2, the photoconductor driver 10 includes a motor 20 serving as a driving source; a planetary gear transmission 30; the joint 41; and a photoconductor shaft 50 serving as a rotary body shaft mounting the photoconductor 1. As shown in FIG. 3, the joint 41 couples the photoconductor shaft 50 to an output shaft 40 of the planetary gear transmission 30. A bearing 51 is fitted onto the photoconductor shaft 50 and supported by a rear support plate 62 constituting a part of a cabinet of the body 100. One end, that is, a left end in FIG.

3, of the photoconductor shaft 50 in an axial direction thereof not coupled to the output shaft 40 of the planetary gear transmission 30 is supported by a front support plate 61, constituting a part of the cabinet of the body 100, via a bearing 56. That is, both ends of the photoconductor shaft 50 in the axial direction thereof are supported by the rear support plate 62 and the front support plate 61, constituting a part of the cabinet of the body 100, via the bearings 51 and 56, respectively. Accordingly, the photoconductor 1 serving as a rotary body mounted on the photoconductor shaft 50 is supported by the cabinet of the body 100 via the photoconductor shaft 50.

With reference to FIG. 3, a detailed description is now given of an interior structure of the planetary gear transmission 30.

The planetary gear transmission 30 of the present embodiment employs a planetary gear system with a 2K-H type two-stage structure. Alternatively, the planetary gear transmission 30 may employ a three-stage or four-stage structure according to reduction ratio.

Typically, the 2K-H type planetary gear system is constructed of four components: a sun gear, planet gears, a carrier that supports revolution of the planet gears, and an outer gear. The three basic components of the planetary gear system are the rotatable sun gear, the rotatable planet gears that revolve about the sun gear or the carrier, and the rotatable outer gear. One of these three basic components is held stationary; one of the two remaining components is an input; the last component is an output. A single unit of the planetary gear system can provide switching between a plurality of reduction ratios and rotation directions depending on which of the three basic components is held stationary, an input, or an output. The 2K-H type two-stage structure employed by the planetary gear transmission 30 according to this exemplary embodiment is classified as a compound planetary gear system containing two or more 2K-H type planet sets. For example, each of the two or more 2K-H type planet sets includes three basic shafts. Two of these three basic shafts are coupled; the remaining one basic shaft is held stationary; another shaft is a driving shaft or a driven shaft.

The reduction ratio R is described by equation (1) below, where Za is the number of teeth of the sun gear, Zb is the number of teeth of each planet gear, and Zc is the number of teeth of the outer gear. A suffix 1 indicates a first stage and a suffix 2 indicates a second stage.

$$R = Za1/(Za1+Zc1) \times Za2/(Za2+Zc2) \quad (1)$$

The planetary gear transmission 30 according to this exemplary embodiment has a two-stage structure constructed of a first stage planetary gear system 30a and a second stage planetary gear system 30b. The first stage planetary gear system 30a includes a primary sun gear 31 mounted on a motor output shaft 21 serving as a driving shaft of the motor 20 serving as a driving source. For example, the motor output shaft 21 is manufactured into the primary sun gear 31 by gear cutting. In the first stage planetary gear system 30a, a primary carrier 34 supports primary planet gears 33 meshed with the primary sun gear 31 and an outer gear 32 encircling the primary planet gears 33 and fastened to a bracket 22. Thus, the primary planet gears 33 revolve about an outer circumference of the primary sun gear 31. The primary carrier 34 supports three primary planet gears 33 concentrically for rotation balance and torque sharing. For example, the primary carrier 34 is divided into three equal sections in a circumferential direction thereof, each of which accommodates the primary planet gear 33. The primary planet gear 33 is supported by a primary carrier pin 35 mounted on the primary carrier 34 in such a manner that the primary planet gear 33 rotates about its axis.

The primary planet gear 33 meshed with the primary sun gear 31 and the outer gear 32 rotates about its axis and revolves about the primary sun gear 31. The primary carrier 34 supporting the primary planet gears 33 rotates at a decreased speed relative to the primary sun gear 31, attaining a reduction ratio at the first stage.

The primary carrier 34 is supported by no supportive component and is rotatably levitated. A secondary sun gear 36 provided on a rotation axis of the primary carrier 34 is an input of the second stage planetary gear system 30b.

In the second stage planetary gear system 30b, a secondary carrier 38 supports secondary planet gears 37 meshed with the secondary sun gear 36 and the outer gear 32 extending across the first stage planetary gear system 30a and the second stage planetary gear system 30b. Thus, the secondary planet gears 37 revolve about an outer circumference of the secondary sun gear 36. Each secondary planet gear 37 is supported by a secondary carrier pin 39 mounted on the secondary carrier 38 in such a manner that the secondary planet gear 37 rotates about its axis and revolves about the secondary sun gear 36. Similar to the three primary planet gears 33 incorporated in the first stage planetary gear system 30a, the secondary carrier 38 supports three secondary planet gears 37 concentrically. A rotation axis of the secondary carrier 38 of the second stage planetary gear system 30b serving as the last stage of the planetary gear transmission 30 is connected to the output shaft 40 coupled to the photoconductor shaft 50 by the hollow cylindrical joint 41. The output shaft 40 is supported by a bearing 57 fitted to an outer gear cap 42. The outer gear cap 42 is attached to one end of the outer gear 32 in the axial direction of the photoconductor shaft 50 facing the photoconductor 1, thus being positioned by the outer gear 32 to shield the primary carrier 34, the secondary carrier 38, the primary planet gears 33, and the secondary planet gears 37. Since the outer gear cap 42 is fitted into an inner circumference of the outer gear 32, the output shaft 40 and an axis of the outer gear 32 are coaxial. The photoconductor shaft 50 is coaxially coupled to the output shaft 40 through the joint 41.

With reference to FIGS. 4 and 5, a detailed description is now given of a configuration of the joint 41.

As shown in FIG. 4, the joint 41 is a hollow cylinder. A diameter of the photoconductor shaft 50 is identical to a diameter of the output shaft 40 of the planetary gear transmission 30. The joint 41 is fitted onto the photoconductor shaft 50. Conversely, the joint 41 is attached to the output shaft 40 by clearance fit. Specifically, the joint 41 is fastened to the output shaft 40 by a hinge screw 43a.

FIG. 5 illustrates the joint 41S as a variation of the joint 41 shown in FIG. 4. As shown in FIG. 5, the hollow cylindrical joint 41S includes a slit 41a extending from a center to a circumferential edge thereof facing the output shaft 40 in the axial direction of the photoconductor shaft 50. A screw 43b fastens the joint 41S to the output shaft 40. The slit 41a of the joint 41S allows the joint 41S to be bent by pressure from the screw 43b pressing against the joint 41S and to couple the output shaft 40 to the photoconductor shaft 50 by friction between the output shaft 40 and the joint 41S.

Both the joint 41 shown in FIG. 4 and the joint 41S shown in FIG. 5 minimize deviation of an axis of the photoconductor shaft 50 from that of the output shaft 40, facilitating transmission of driving force from the output shaft 40 to the photoconductor shaft 50.

With reference to FIG. 3, a detailed description is now given of a configuration of the bracket 22.

As shown in FIG. 3, the bracket 22 supports the motor 20. The outer gear 32 is fastened to the bracket 22 by screws 43. Thus, the motor 20 and the outer gear 32 are stationarily supported by the bracket 22. The bracket 22 is fastened to a driver plate 63 by screws. The driver plate 63 is supported by a stud 64 swaged into the rear support plate 62. A hollow cylindrical boss is provided on the axis of the outer gear 32 at one end, that is, a right end in FIG. 3, of the outer gear 32 in the axial direction of the photoconductor shaft 50 facing the motor 20. A bearing provided on the motor 20 is fitted into an inner circumference of the hollow cylindrical boss. An outer circumference of the hollow cylindrical boss is fitted into a through-hole produced through the bracket 22.

With the configuration described above, the axes of the motor output shaft 21, the bracket 22, and the output shaft 40 are coaxial on a dotted line C relative to the outer gear 32, minimizing degradation in coaxiality due to variation in size of these components.

With reference to FIG. 3, a detailed description is now given of a configuration of the photoconductor 1.

As shown in FIG. 3, the photoconductor 1 is constructed of a cylindrical drum 52 and drum flanges 53a and 53b mounted on both lateral ends of the drum 52 in the axial direction of the photoconductor shaft 50. The drum 52 is supported by the photoconductor shaft 50 through the drum flanges 53a and 53b. Each of the drum flanges 53a and 53b is produced with a through-hole at an axis of the drum 52. Thus, the photoconductor shaft 50 is fitted into the through-hole of each of the drum flanges 53a and 53b. A joint 55 is fitted onto the photoconductor shaft 50 to receive driving force from the motor 20 through the photoconductor shaft 50. The joint 55 couples the photoconductor shaft 50 to the drum flange 53a, thus transmitting driving force received from the photoconductor shaft 50 to the drum 52 through the drum flange 53a. Accordingly, the axes of the motor output shaft 21 mounting the primary sun gear 31, the outer gear 32, the primary carrier 34 mounting the secondary sun gear 36, the secondary carrier 38, the output shaft 40 of the planetary gear transmission 30, the photoconductor shaft 50, and the drum 52 are coaxial on the dotted line C.

The components incorporated in the planetary gear transmission 30 are made of the following materials. For example, the motor output shaft 21 of the motor 20 also serving as an input shaft of the planetary gear transmission 30 which is manufactured into the primary sun gear 31, the primary carrier pin 35, the secondary carrier pin 39, and the secondary carrier 38 are made of metal, such as stainless steel, carbon steel, or the like. Conversely, the primary planet gears 33, the primary carrier 34, the secondary sun gear 36 combined with the primary carrier 34, the secondary planet gears 37, and the outer gear 32 meshed with the primary planet gears 33 and the secondary planet gears 37 and combined with a housing of the planetary gear transmission 30 are made of resin such as molded polyacetal or the like.

A rotation speed detector 90 is disposed inboard from the outer gear 32 in the axial direction of the photoconductor shaft 50, thus serving as a rotation speed detector that detects a rotation speed of the photoconductor 1. An axis of an encoder disk 90a of the rotation speed detector 90 is coaxial with the axes of the outer gear 32, the motor output shaft 21, the bracket 22, and the output shaft 40 of the planetary gear transmission 30 on the dotted line C. The encoder disk 90a of the rotation speed detector 90 is disposed upstream from the joint 41 in a driving force transmission direction. In the present embodiment, the rotation speed detector 90 is constructed of the encoder disk 90a and two sensors. Alternatively, the number of sensors may be varied depending on desired control precision.

Since the photoconductor driver 10 includes the planetary gear transmission 30 described above, the photoconductor driver 10 minimizes variation in the rotation speed of the photoconductor 1 without a large-diameter gear and a direct driving motor as a driving source. The motor output shaft 21 of the motor 20, the primary sun gear 31, the outer gear 32, the primary carrier 34, the secondary sun gear 36 combined with the primary carrier 34, the secondary carrier 38, the output shaft 40 of the planetary gear transmission 30 combined with the secondary carrier 38, the photoconductor shaft 50, the photoconductor 1, and the encoder disk 90a of the rotation speed detector 90 are coaxial on the dotted line C, minimizing degradation in coaxiality due to variation in size of these components. The primary carrier 34 is levitated relative to the outer gear 32, attaining self-aligning that minimizes concentric error between the primary carrier 34 and the outer gear 32 and therefore minimizing variation in the rotation speed of the photoconductor 1.

Additionally, the rotation speed detector 90 provides feedback for the motor 20, minimizing variation in the rotation speed of the photoconductor 1 due to concentric error caused by assembly error of the components of the photoconductor driver 10. For example, a controller 98, that is, a central processing unit (CPU), provided with a random-access memory (RAM) and a read-only memory (ROM), is operatively connected to the rotation speed detector 90 and the motor 20. The controller 98 adjusts a rotation speed of the motor 20 based on the rotation speed of the photoconductor 1 detected by the rotation speed detector 90 so that the photoconductor 1 rotates at a predetermined rotation speed. Thus, the photoconductor driver 10 drives and rotates the photoconductor 1 with improved precision.

Since the photoconductor driver 10 includes the planetary gear transmission 30, the photoconductor driver 10 does not require a direct driving motor as a driving source, achieving weight reduction. The outer gear 32, the primary planet gears 33, the secondary planet gears 37, the primary carrier 34, the secondary sun gear 36 combined with the primary carrier 34 incorporated in the planetary gear transmission 30 are made of resin. Accordingly, these resin components of the planetary gear transmission 30 reduce the weight of the photoconductor driver 10 compared to a configuration of a conventional planetary gear transmission incorporating metal components instead of the resin components described above. Consequently, the lightweight photoconductor driver 10 contributes to resource saving for the image forming apparatus 500.

The planetary gear transmission 30 is a resin-metal hybrid. For example, the outer gear 32, the primary planet gears 33, the secondary planet gears 37, the primary carrier 34, the secondary sun gear 36 combined with the primary carrier 34 are made of resin; the secondary carrier 38 is made of metal. The metal output shaft 40 is combined with the metal secondary carrier 38. Since the output shaft 40 and the secondary carrier 38 combined with the output shaft 40 are made of metal, the output shaft 40 and the secondary carrier 38 endure enhanced load imposed thereon by the photoconductor 1 compared to a configuration in which the output shaft 40 and the secondary carrier 38 are also made of resin. Accordingly, the hybrid planetary gear transmission 30 attains the lightweight photoconductor driver 10 that achieves resource saving and at the same time endures enhanced load from the photoconductor 1 compared to the configuration in which all of the major components of the planetary gear transmission 30 are made of resin.

The rear support plate 62 that rotatably supports the photoconductor shaft 50 through the bearing 51 fixedly positions the photoconductor shaft 50 in a radial direction thereof. The rear support plate 62 that supports the outer gear 32 of the planetary gear transmission 30 through the stud 64 and the bracket 22 fixedly positions the outer gear 32. Accordingly, when the photoconductor driver 10 is assembled into the body 100, if the photoconductor shaft 50 is deviated from the output shaft 40 of the planetary gear transmission 30, driving force from the motor 20 may not be transmitted from the output shaft 40 to the photoconductor shaft 50 smoothly, resulting in variation in the rotation speed of the photoconductor 1.

To address this problem, the outer gear 32, the primary planet gears 33, the secondary planet gears 37, the primary carrier 34, the secondary sun gear 36 combined with the primary carrier 34 are made of resin and elastically deformable in the radial direction. Accordingly, even if the photoconductor shaft 50 is deviated from the output shaft 40 of the planetary gear transmission 30, that is, even if the photoconductor shaft 50 and the output shaft 40 are not coaxial, these elastically deformable resin components elastically deform to perform self-aligning, resulting in precise rotation of the photoconductor 1. Further, an amount of elastic deformation for self-aligning is distributed among these elastically deformable components, enhancing durability of the photoconductor driver 10.

The metal output shaft 40 allows the joint 41 to couple the output shaft 40 to the photoconductor shaft 50 to transmit driving force from the output shaft 40 to the photoconductor shaft 50 by minimizing deviation of the axis of the output shaft 40 from the axis of the photoconductor shaft 50. The joint 41 coupling the output shaft 40 to the photoconductor shaft 50 does not require a loose coupler, such as a spline joint, that couples an output shaft (e.g., the output shaft 40) of a planetary gear transmission (e.g., the planetary gear transmission 30) to a rotary body shaft (e.g., the photoconductor shaft 50), which is employed by a planetary gear transmission constructed of resin components only. Hence, the joint 41 prevents variation in the rotation speed of the photoconductor 1 that may arise with the loose coupler.

Additionally, the location of the rotation speed detector 90 is not limited to a position downstream from the joint 41 in the driving force transmission direction. For example, the rotation speed detector 90 may be located upstream from the joint 41, that is, at a position intermediate between the planetary gear transmission 30 and the joint 41 in the driving force transmission direction.

The rotation speed detector 90 disposed in proximity to the planetary gear transmission 30 is installed into the photoconductor driver 10 while facilitating assembly of the photoconductor driver 10.

For example, the encoder disk 90a of the rotation speed detector 90 is attached to the output shaft 40 of the planetary gear transmission 30 mounted on the bracket 22 mounting the motor 20. The sensors of the rotation speed detector 90 are attached to the housing combined with the outer gear 32. The encoder disk 90a and the sensors of the rotation speed detector 90 are fixedly secured to the output shaft 40 and the housing, respectively, after positioning. Thereafter, the photoconductor shaft 50 is coupled to the output shaft 40 of the planetary gear transmission 30 by the joint 41. Then, the photoconductor shaft 50 is inserted into the through-hole produced through the rear support plate 62; the planetary gear transmission 30 is inserted into the through-hole produced through the driver plate 63. The photoconductor shaft 50 and the planetary gear transmission 30 are attached to the rear support plate 62 and the driver plate 63, respectively, after positioning.

Thus, the rotation speed detector 90 is installed into the photoconductor driver 10, performing feedback control that attains precise rotation of the photoconductor 1. Accordingly, the photoconductor driver 10 achieves a lightweight resulting in resource saving and at the same time precise rotation of the photoconductor 1.

Figure 6:
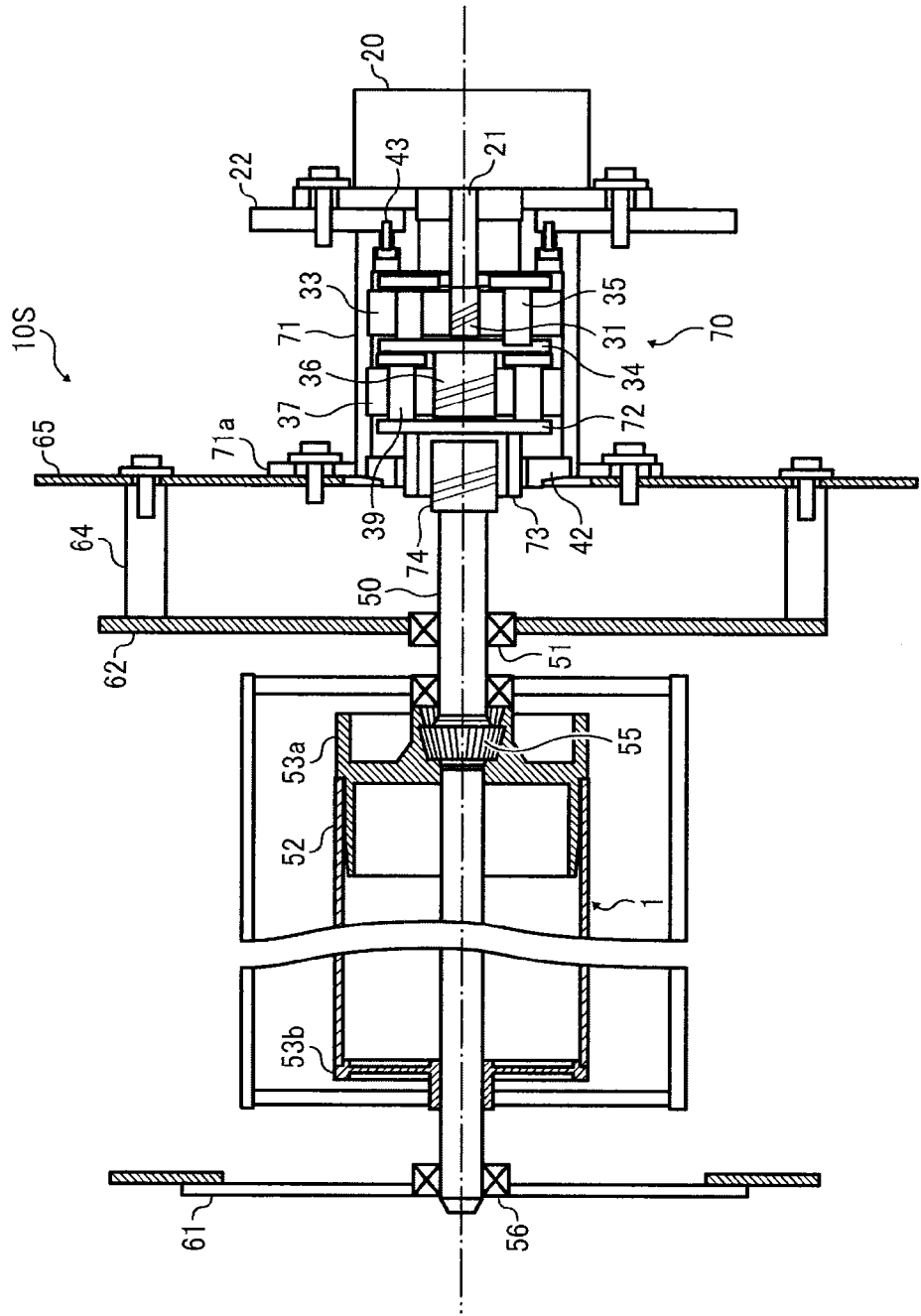
FIG. 6 is a vertical sectional view of a comparative photoconductor driver incorporating a carrier made of resin.

With reference to FIG. 6, a description is provided of a configuration of a comparative photoconductor driver 10S incorporating a resin secondary carrier 72 instead of the metal secondary carrier 38 shown in FIG. 3.

FIG. 6 is a vertical sectional view of the photoconductor driver 10S incorporating a carrier made of resin. As shown in FIG. 6, the photoconductor driver 10S includes a planetary gear transmission 70 incorporating the secondary carrier 72 as the last stage carrier. The secondary carrier 72 is combined with a cylindrical output 73 mounting a female spline joint on an inner circumferential surface thereof. The female spline joint is meshed with a male spline joint 74 mounted on the photoconductor shaft 50. It is because if the resin secondary carrier 72 mounts a resin output shaft that is coupled to the photoconductor shaft 50 by the joint 41 shown in FIG. 4 or the joint 41S shown in FIG. 5, the resin secondary carrier 72 and the resin output shaft may not endure rotation load imposed by the photoconductor 1 and the photoconductor shaft 50.

If the loose coupler constructed of the female spline joint and the male spline joint 74 described above couples the output 73 of the planetary gear transmission 70 to the photoconductor shaft 50, it is necessary to locate the rotation speed detector 90 depicted in FIG. 3 at a position downstream from the loose coupler in the driving force transmission direction, that is, a position in proximity to the photoconductor shaft 50. Thus, variation in the rotation speed of the photoconductor 1 caused by the loose coupler is eliminated and the rotation speed detector 90 performs feedback control that attains precise rotation of the photoconductor 1. However, it is difficult to attach the rotation speed detector 90 to the photoconductor shaft 50 in view of assembly of the photoconductor driver 10S due to reasons described below.

As described above, if the loose coupler constructed of the female spline joint and the male spline joint 74 couples the output 73 of the planetary gear transmission 70 to the photoconductor shaft 50, it is necessary to attach the encoder disk 90a of the rotation speed detector 90 to the photoconductor shaft 50. That is, it is impossible to attach the rotation speed detector 90 to a position in proximity to the planetary gear transmission 70. Further, in a state in which the output 73 is combined with the photoconductor shaft 50, it is impossible to insert the photoconductor shaft 50 into a through-hole produced through the rear support plate 62 and insert the planetary gear transmission 70 into a through-hole produced through a driver plate 65. Moreover, it is necessary to locate the rotation speed detector 90 at a position between the rear support plate 62 and the driver plate 65 that supports the planetary gear transmission 70 in the axial direction of the photoconductor shaft 50.

However, since an interval between the rear support plate 62 and the driver plate 65 is small, it is difficult to attach the encoder disk 90a of the rotation speed detector 90 to the photoconductor shaft 50 and attach the sensors to the rear support plate 62 or the driver plate 65, that is, to perform position adjustment and fixing of the encoder disk 90a and the sensors, through the interval between the rear support plate 62 and the driver plate 65 in both the axial direction of the photoconductor shaft 50 and a direction orthogonal to it. Hence, if the loose coupler constructed of the female spline joint and the male spline joint 74 described above couples the output 73 of the planetary gear transmission 70 to the photoconductor shaft 50 shown in FIG. 6, it is difficult to install the rotation speed detector 90 shown in FIG. 3 that facilitates precise rotation of the photoconductor 1 into the photoconductor driver 10S.

The planetary gear transmission 30 shown in FIG. 3 includes the primary sun gear 31, the primary carrier pin 35, the secondary carrier pin 39, and the secondary carrier 38, which are made of metal and the outer gear 32, the primary planet gears 33, the primary carrier 34, the secondary sun gear 36, and the secondary planet gears 37, which are made of resin. Alternatively, the outer gear 32 is made of resin but the primary planet gears 33, the secondary planet gears 37, the primary carrier 34, and the secondary sun gear 36 combined with the primary carrier 34 may be made of metal as needed.

For example, if the outer gear 32 is made of resin, the planetary gear transmission 30 may be lightweight compared to a configuration in which all the major components of the planetary gear transmission 30 are made of metal and at the same time may be endurable against load from the photoconductor 1 compared to a configuration in which all the major components of the planetary gear transmission 30 are made of resin. That is, although a configuration in which only the outer gear 32 is made of resin is heavier than the configuration shown in FIG. 3 in which the primary planet gears 33, the primary carrier 34, the secondary sun gear 36, and the secondary planet gears 37 are also made of resin in addition to the outer gear 32, the configuration in which only the outer gear 32 is made of resin is lightweight compared to the configuration in which all the major components of the planetary gear transmission 30 are made of metal, thus saving resources and at the same time is endurable against load from the photoconductor 1 compared to the configuration in which all the major components of the planetary gear transmission 30 are made of resin. The resin outer gear 32 is elastically deformable in a radial direction thereof. Accordingly, even if the axis of the photoconductor shaft 50 deviates from the axis of the output shaft 40 of the planetary gear transmission 30, the resin outer gear 32 elastically deforms in the radial direction thereof for self-aligning, eliminating deviation of the photoconductor shaft 50 from the output shaft 40 and thereby attaining precise rotation of the photoconductor 1.

If the primary planet gears 33 and the secondary planet gears 37, in addition to the outer gear 32, are made of resin, they reduce the weight of the photoconductor driver 10. The primary planet gears 33 and the secondary planet gears 37 made of resin are elastically deformable in a radial direction thereof, attaining the advantages below. If the axis of the photoconductor shaft 50 deviates from the axis of the output shaft 40 of the planetary gear transmission 30, an amount of elastic deformation of the outer gear 32 in the radial direction thereof for self-aligning to render the photoconductor shaft 50 and the output shaft 40 precisely coaxial is smaller than an amount thereof when only the outer gear 32 is made of resin, thus improving durability of the photoconductor driver 10.

The outer gear 32 is cantilevered beyond the bracket 22 mounting the motor 20 to increase an amount of elastic deformation of the resin outer gear 32 in the radial direction thereof. For example, the bracket 22 couples the motor 20 to the planetary gear transmission 30. The bracket 22 is fastened to the driver plate 63 fastened to the stud 64. The stud 64 is swaged into the rear support plate 62. Thus, the driver plate 63 and the stud 64 serve as an anchor that anchors the motor 20 to the rear support plate 62. Thus, the planetary gear transmission 30 indirectly supported by the rear support plate 62 allows the outer gear 32 to be cantilevered beyond the bracket 22 mounting the motor 20, increasing an amount of elastic deformation of the resin outer gear 32 in the radial direction thereof. Accordingly, even if the axis of the photoconductor shaft 50 deviates from the axis of the output shaft 40 of the planetary gear transmission 30 substantially, the resin outer gear 32 with the increased amount of elastic deformation corresponds to the substantial deviation of the axis of the photoconductor shaft 50 from the axis of the output shaft 40, thus attaining precise rotation of the photoconductor 1.

Figure 7:
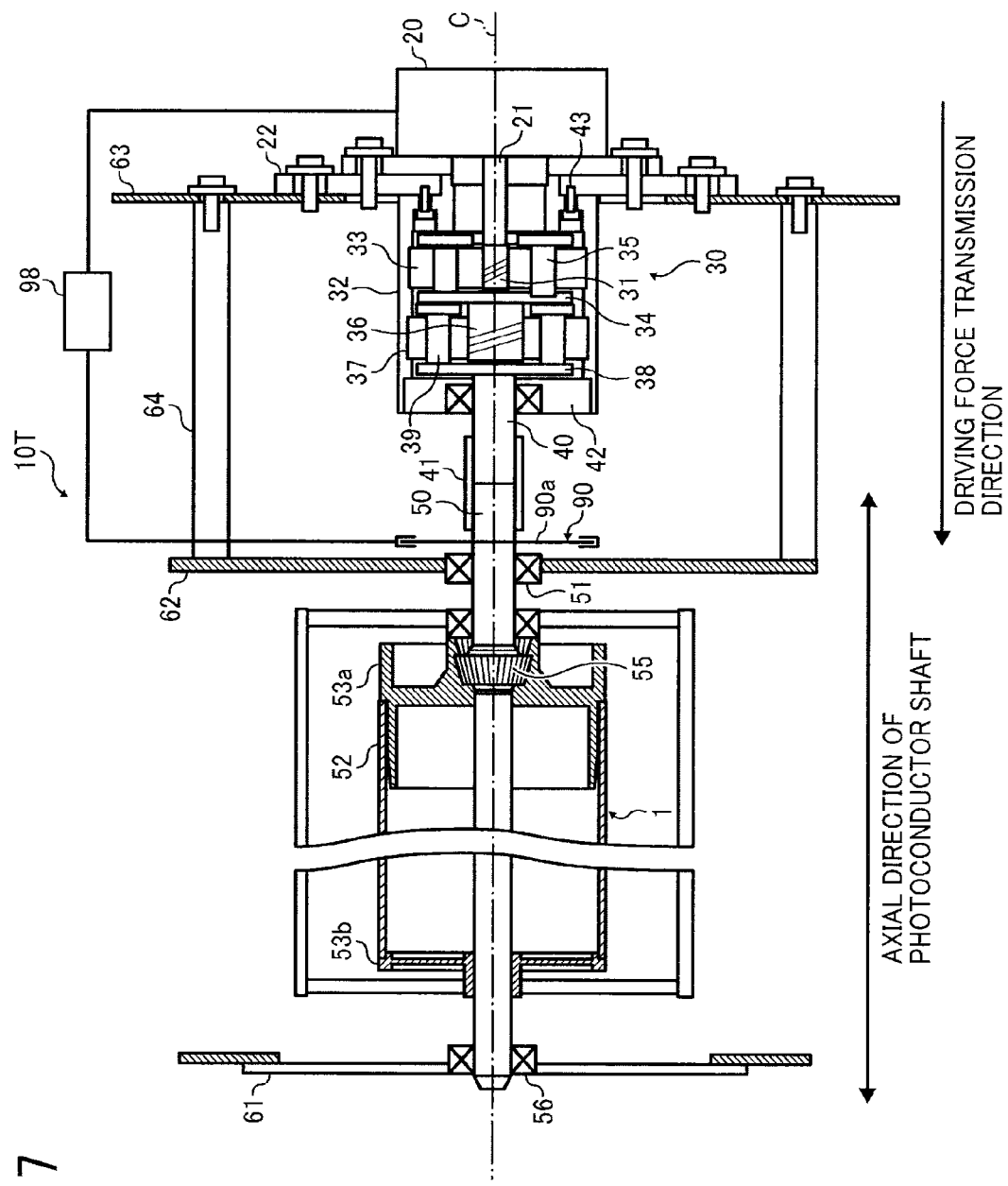
FIG. 7 is a vertical sectional view of a photoconductor driver according to a second exemplary embodiment installable in the image forming apparatus shown in FIG. 1.

With reference to FIG. 7, a description is provided of a configuration of a photoconductor driver 10T according to a second exemplary embodiment.

FIG. 7 is a vertical sectional view of the photoconductor driver 10T. The photoconductor driver 10T is different from the photoconductor driver 10 shown in FIG. 3 in that the rotation speed detector 90 incorporated in the photoconductor driver 10T is situated at a position different from that of the rotation speed detector 90 incorporated in the photoconductor driver 10. Accordingly, the components of the photoconductor driver 10T shown in FIG. 7 that also appear in FIG. 3 are assigned with reference numerals identical to those shown in FIG. 3. The configuration, operation, and advantages of the photoconductor driver 10T that are equivalent to those of the photoconductor driver 10 are omitted.

As shown in FIG. 7, unlike the rotation speed detector 90 of the photoconductor driver 10 shown in FIG. 3 disposed upstream from the joint 41 in the driving force transmission direction, the rotation speed detector 90 of the photoconductor driver 10T is disposed downstream from the joint 41 in the driving force transmission direction. Like the joint 41 of the photoconductor driver 10 shown in FIG. 3, the joint 41 of the photoconductor driver 10T allows the rotation speed detector 90 to be installed in the photoconductor driver 10T without obstructing assembly of the photoconductor driver 10T.

For example, after the encoder disk 90a of the rotation speed detector 90 is attached to the photoconductor shaft 50, the joint 41 couples the photoconductor shaft 50 to the output shaft 40 of the planetary gear transmission 30 mounted on the bracket 22 that mounts the motor 20. The sensors of the rotation speed detector 90 are attached to the housing combined with the outer gear 32. Then, the encoder disk 90a attached to the photoconductor shaft 50 and the sensors attached to the housing are positioned and fixed. Thereafter, the photoconductor shaft 50 is inserted into the through-hole produced through the rear support plate 62; the planetary gear transmission 30 is inserted into the through-hole produced through the driver plate 63. The photoconductor shaft 50 and the planetary gear transmission 30 are attached to the rear support plate 62 and the driver plate 63 via the bearing 51 and the bracket 22, respectively, after positioning.

Thus, the rotation speed detector 90 is installed into the photoconductor driver 10T, performing feedback control of the motor 20 through the controller 98 that attains precise rotation of the photoconductor 1. Accordingly, the photoconductor driver 10T achieves a lightweight resulting in resource saving and at the same time precise rotation of the photoconductor 1. Additionally, the rotation speed detector 90 disposed downstream from the joint 41 in the driving force transmission direction provides feedback for the motor 20, minimizing variation in the rotation speed of the photoconductor 1 due to loose coupling of the joint 41. Accordingly, the photoconductor driver 10T drives and rotates the photoconductor 1 with enhanced precision.

Figure 8:
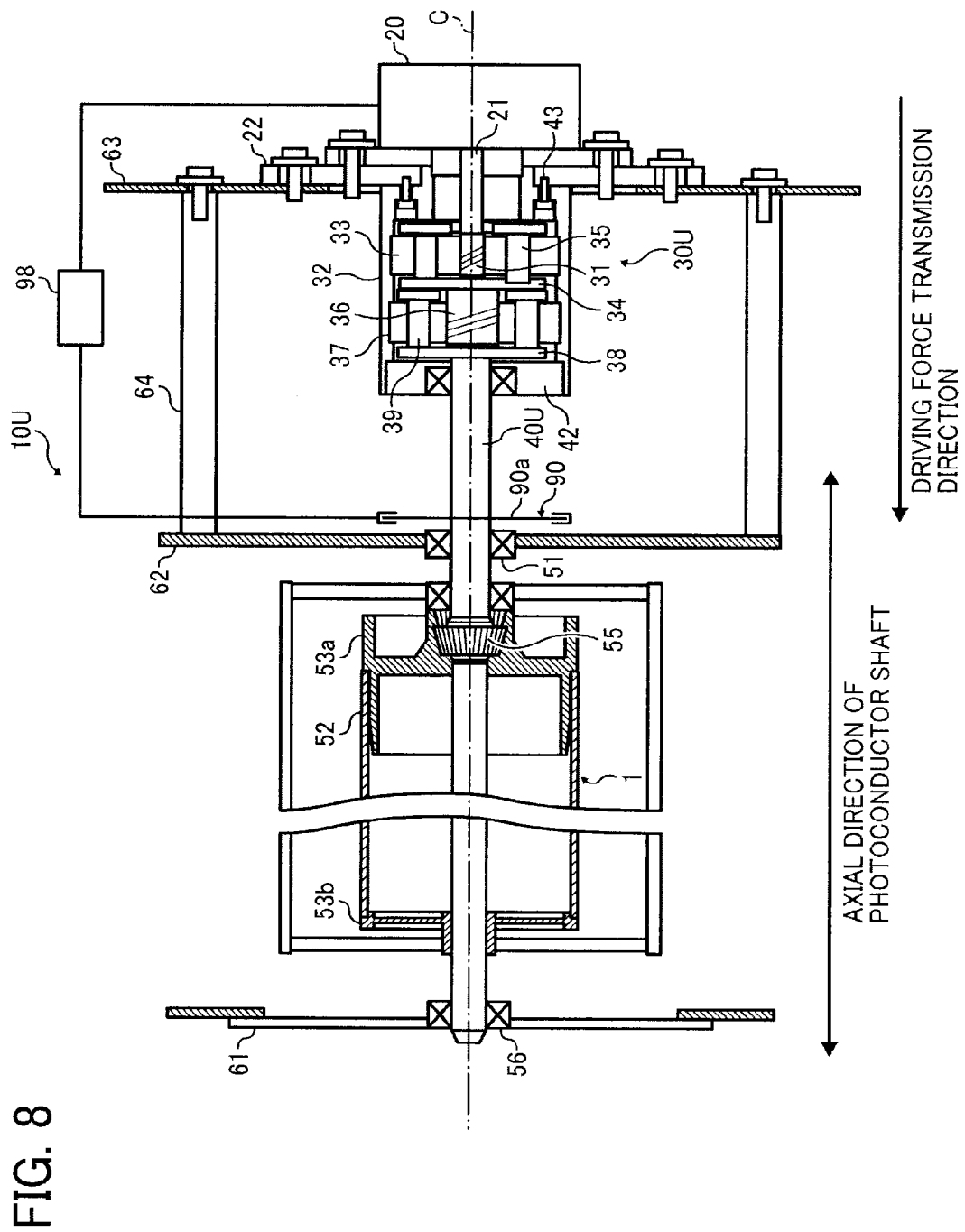
FIG. 8 is a vertical sectional view of a photoconductor driver according to a third exemplary embodiment installable in the image forming apparatus shown in FIG. 1.

With reference to FIG. 8, a description is provided of a configuration of a photoconductor driver 10U according to a third exemplary embodiment.

FIG. 8 is a vertical sectional view of the photoconductor driver 10U. The photoconductor driver 10U is different from the photoconductor drivers 10 and 10T shown in FIGS. 3 and 7, respectively, in that an output shaft 40U of a planetary gear transmission 30U incorporated in the photoconductor driver 10U also serves as a photoconductor shaft. Accordingly, the components of the photoconductor driver 10U shown in FIG. 8 that also appear in FIGS. 3 and 7 are assigned with reference numerals identical to those shown in FIGS. 3 and 7. The configuration, operation, and advantages of the photoconductor driver 10U that are equivalent to those of the photoconductor drivers 10 and 10T are omitted.

As shown in FIG. 8, unlike the output shaft 40 shown in FIGS. 3 and 7 that is separately provided from the photoconductor shaft 50, the output shaft 40U of the photoconductor driver 10U serves as a shaft of the planetary gear transmission 30U and the photoconductor 1. For example, the output shaft 40U extends to the front support plate 61 to support the drum 52 through the drum flanges 53a and 53b. Since the output shaft 40U also serves as a photoconductor shaft, the joint 41 shown in FIGS. 3 and 7 that couples the output shaft 40 to the photoconductor shaft 50 to render the output shaft 40 and the photoconductor shaft 50 coaxial is unnecessary. The rotation speed detector 90 is interposed between the bearing 51 supporting the output shaft 40U and the outer gear cap 42 in an axial direction of the output shaft 40U, performing feedback control of the motor 20 through the controller 98 for precise rotation of the photoconductor 1. Thus, the output shaft 40U serving as a shaft of the planetary gear transmission 30U and the photoconductor 1 eliminates variation in the rotation speed of the photoconductor 1 that may arise from loose coupling between the output shaft 40 and the photoconductor shaft 50.

Figure 9:
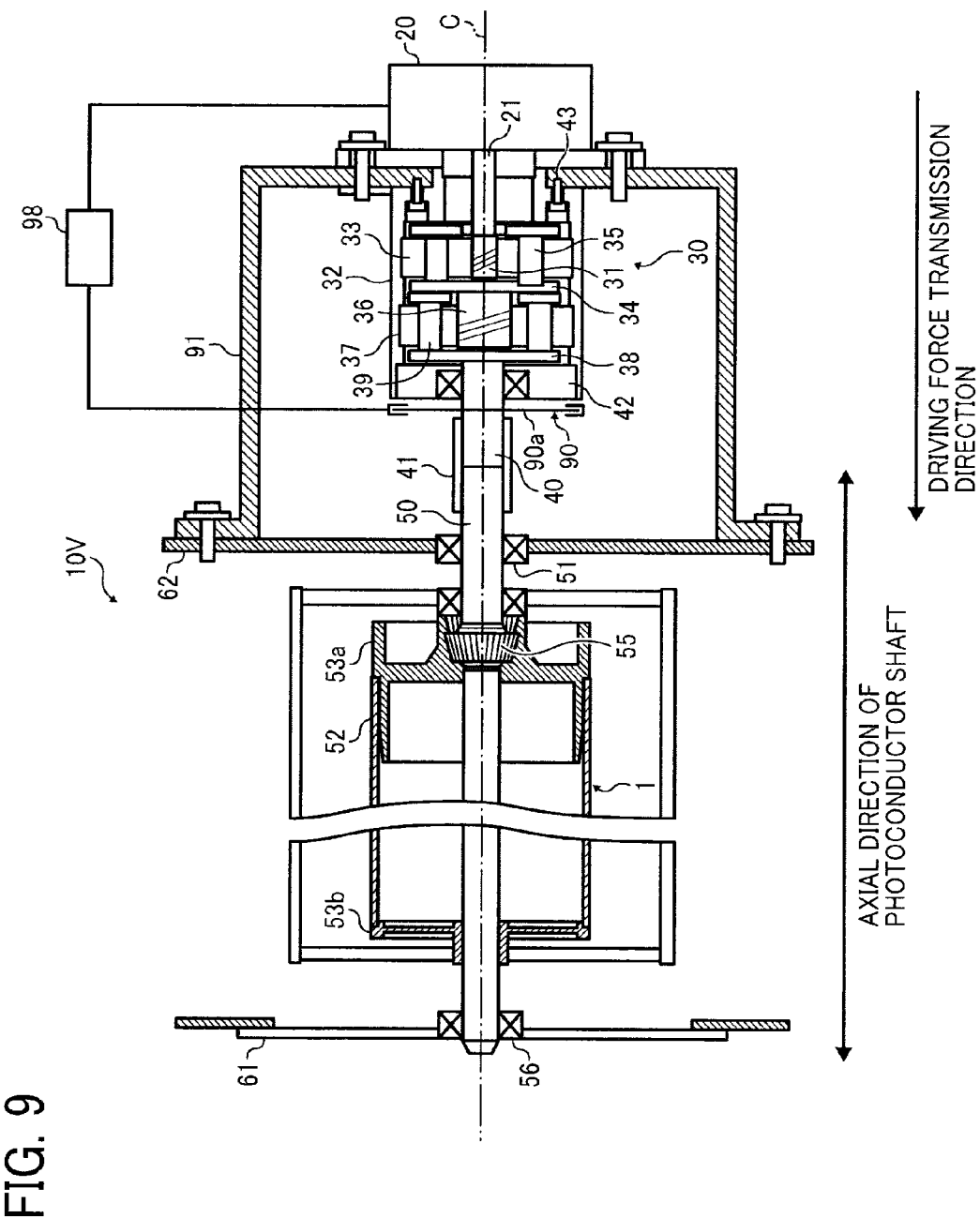
FIG. 9 is a vertical sectional view of a photoconductor driver according to a fourth exemplary embodiment installable in the image forming apparatus shown in FIG. 1.

With reference to FIG. 9, a description is provided of a configuration of a photoconductor driver 10V according to a fourth exemplary embodiment.

FIG. 9 is a vertical sectional view of the photoconductor driver 10V. The photoconductor driver 10V is different from the photoconductor driver 10 shown in FIG. 3 in that the motor 20 and the planetary gear transmission 30 incorporated in the photoconductor driver 10V are supported by the rear support plate 62 instead of the driver plate 63 depicted in FIG. 3. Accordingly, the components of the photoconductor driver 10V shown in FIG. 9 that also appear in FIG. 3 are assigned with reference numerals identical to those shown in FIG. 3. The configuration, operation, and advantages of the photoconductor driver 10V that are equivalent to those of the photoconductor driver 10 are omitted.

As shown in FIG. 9, the photoconductor driver 10V includes a die casting 91 instead of the driver plate 63, the stud 64, and the bracket 22 shown in FIG. 3. The motor 20 and the planetary gear transmission 30 are directly fastened to the die casting 91 fastened to the rear support plate 62 with screws. For example, the bracket 22 mounting the motor 20 and the planetary gear transmission 30, the stud 64, and the driver plate 63 shown in FIG. 3 are replaced by the die casting 91 directly fastened to the rear support plate 62 with the screws. Accordingly, the die casting 91 that supports the motor 20 and the planetary gear transmission 30 has an increased rigidity and an increased resonance frequency that enhances a frequency band used by the encoder disk 90a of the rotation speed detector 90 for feedback control. For example, the die casting 91 is made of aluminum, zinc, or the like.

Figure 10:
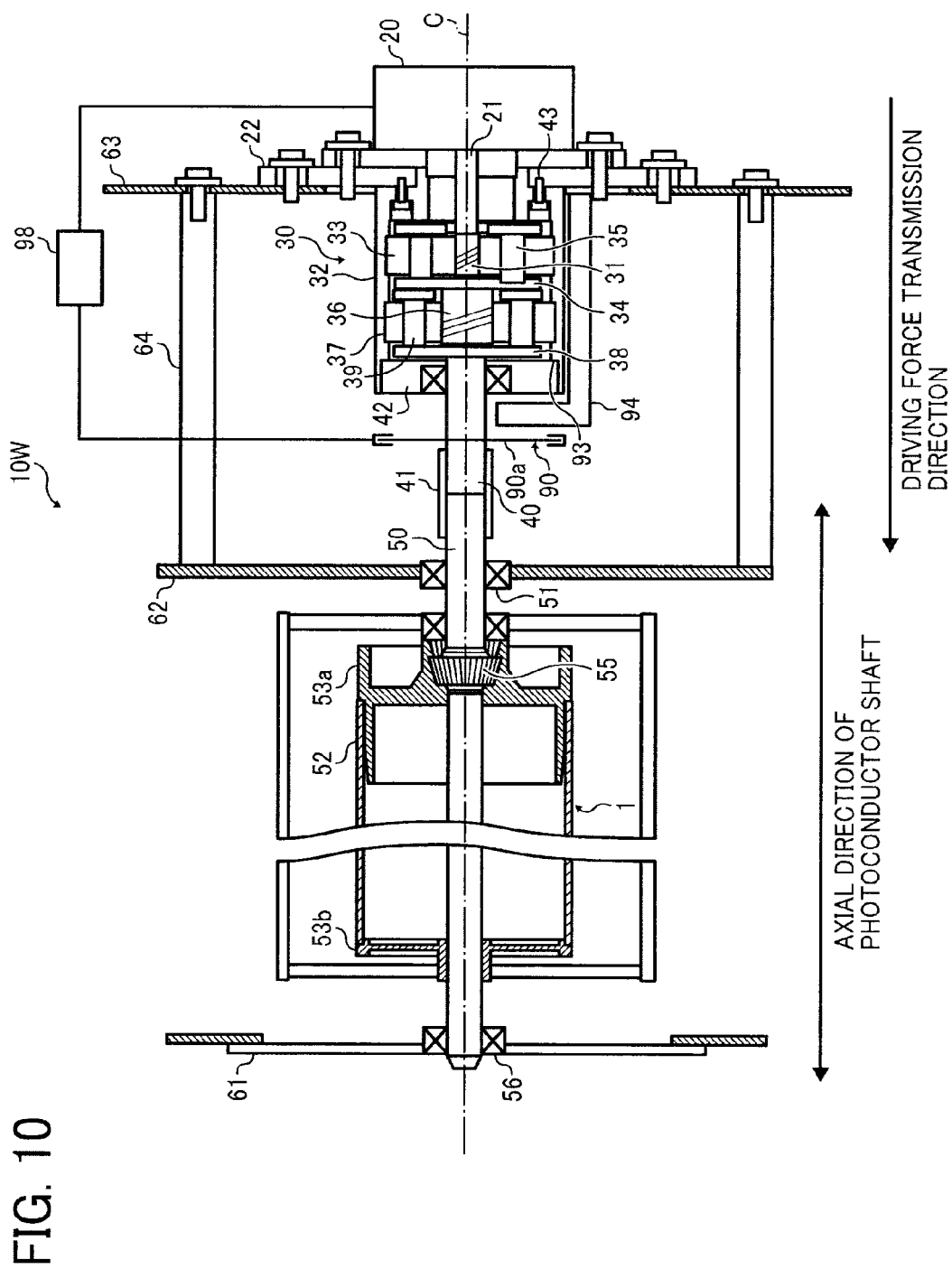
FIG. 10 is a vertical sectional view of a photoconductor driver according to a fifth exemplary embodiment installable in the image forming apparatus shown in FIG. 1.

With reference to FIG. 10, a description is provided of a configuration of a photoconductor driver 10W according to a fifth exemplary embodiment.

FIG. 10 is a vertical sectional view of the photoconductor driver 10W. The photoconductor driver 10W is different from the photoconductor driver 10 shown in FIG. 3 in that the photoconductor driver 10W incorporates a thrust regulator 94, separately provided from the outer gear 32, which regulates movement of the outer gear cap 42 of the planetary gear transmission 30 toward the photoconductor 1 in a direction parallel to an axial direction of the output shaft 40. Accordingly, the components of the photoconductor driver 10W shown in FIG. 10 that also appear in FIG. 3 are assigned with reference numerals identical to those shown in FIG. 3. The configuration, operation, and advantages of the photoconductor driver 10W that are equivalent to those of the photoconductor driver 10 are omitted.

As shown in FIG. 10, like in the photoconductor driver 10 shown in FIG. 3, the outer gear cap 42 is attached to one end of the outer gear 32 in the axial direction of the photoconductor shaft 50 facing the photoconductor shaft 50, thus shielding the primary carrier 34, the secondary carrier 38, the primary planet gears 33, and the secondary planet gears 37. The thrust regulator 94 is separately provided from the outer gear 32, regulating movement of the outer gear cap 42 toward the photoconductor 1 in the direction parallel to the axial direction of the output shaft 40. The thrust regulator 94 is substantially L-shaped in cross-section. A long side of the thrust regulator 94 extends along a lower outer circumferential surface of the outer gear 32 with a predetermined interval therebetween. One end of the thrust regulator 94 in the axial direction of the output shaft 40 facing the motor 20 is mounted on the bracket 22.

Conversely, a short side of the thrust regulator 94 is folded with respect to the long side thereof, thus extending in a direction orthogonal to the axial direction of the output shaft 40. The short side of the thrust regulator 94 extends along an outer face of the outer gear cap 42 facing the photoconductor 1 with a predetermined interval therebetween to a position in proximity to the output shaft 40. Thus, the thrust regulator 94 regulates movement of the outer gear cap 42 toward the photoconductor 1 in the direction parallel to the axial direction of the output shaft 40.

Figure 11:
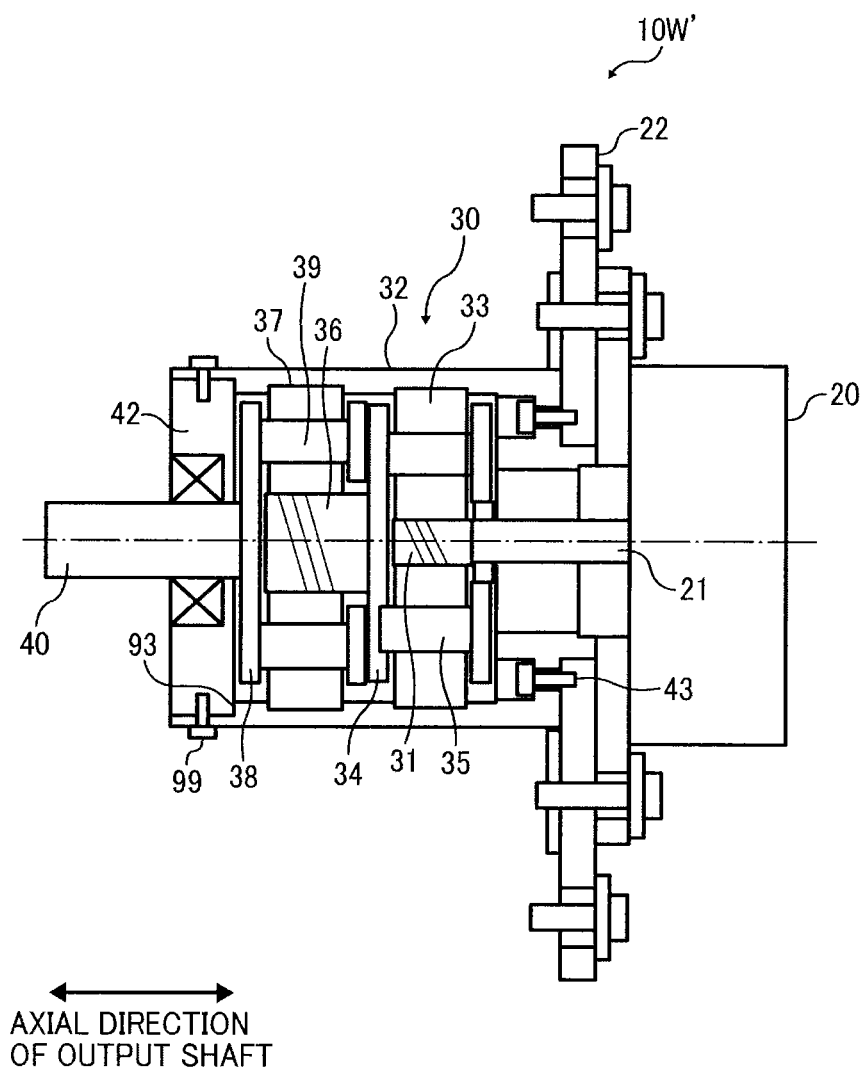
FIG. 11 is a partial vertical sectional view of another comparative photoconductor driver incorporating a plurality of screws for fastening an outer gear to an outer gear cap.

With reference to FIG. 11, a detailed description is now given of reasons for installing the thrust regulator 94 in the photoconductor driver 10W.

FIG. 11 is a partial vertical sectional view of a comparative photoconductor driver 10W' illustrating a configuration that regulates movement of the outer gear cap 42 without the thrust regulator 94 depicted in FIG. 10. As shown in FIG. 11, the outer gear 32 includes a step 93 at one end thereof in the axial direction of the output shaft 40 that faces the photoconductor 1. The outer gear cap 42 slides into the step 93 that halts the outer gear cap 42, thus regulating movement of the outer gear cap 42 toward the motor 20 in the direction parallel to the axial direction of the output shaft 40. The outer gear cap 42 is fastened to the outer gear 32 with a plurality of screws 99 screwed in a direction orthogonal to the axial direction of the output shaft 40. Thus, the step 93 and the screws 99 regulate movement of the outer gear cap 42 toward the photoconductor 1 in the direction parallel to the axial direction of the output shaft 40.

However, if the outer gear cap 42 is fastened to the resin outer gear 32 with the screws 99, the screws 99 exert stress on the outer gear 32, deforming the outer gear 32. Accordingly, the deformed outer gear 32 meshed with the secondary planet gears 37 causes variation in the rotation speed of the secondary carrier 38 rotatably supporting the secondary planet gears 37 with an order proportional to the number of the screws 99 in a single rotational period. Such variation in the rotation speed of the secondary carrier 38 may occur in a band in which feedback control of the motor 20 performed by the rotation speed detector 90 and the controller 98 eliminates variation in the rotation speed of the secondary carrier 38 or a band in which feedback control of the motor 20 performed by the rotation speed detector 90 and the controller 98 does not eliminate variation in the rotation speed of the secondary carrier 38. To address this problem, it is necessary to regulate movement of the outer gear cap 42 toward the photoconductor 1 in the direction parallel to the axial direction of the output shaft 40 without exerting stress on the outer gear 32 that may result in deformation of the outer gear 32, thus preventing periodic variation in the rotation speed of the secondary carrier 38 caused by the screws 99 that fasten the outer gear 32 to the outer gear cap 42 and thereby attaining precise rotation of the secondary carrier 38.

To address this circumstance, the photoconductor driver 10W shown in FIG. 10 incorporates the step 93 at one end, facing the photoconductor 1, of the outer gear 32 in the axial direction of the output shaft 40, which regulates movement of the outer gear cap 42 toward the motor 20 in the direction parallel to the axial direction of the output shaft 40. Additionally, the thrust regulator 94, separately provided from the outer gear 32, regulates movement of the outer gear cap 42 toward the photoconductor 1 in the direction parallel to the axial direction of the output shaft 40 without exerting stress on the outer gear 32. Accordingly, the resin outer gear 32 minimizes periodic variation in the rotation speed of the secondary carrier 38 that may arise from deformation of the outer gear 32, thus rotating the photoconductor 1 more precisely.

The substantially L-shaped thrust regulator 94 is spaced apart from the outer gear 32 and the outer gear cap 42 to allow deformation of the outer gear 32 for self-aligning. For example, in the photoconductor driver 10W shown in FIG. 10, like in the photoconductor driver 10 shown in FIG. 3, if the axis of the photoconductor shaft 50 deviates from the axis of the output shaft 40 of the planetary gear transmission 30, the resin outer gear 32 deforms within space between the outer gear 32 and the thrust regulator 94 to eliminate such deviation by self-aligning.

Figure 12:
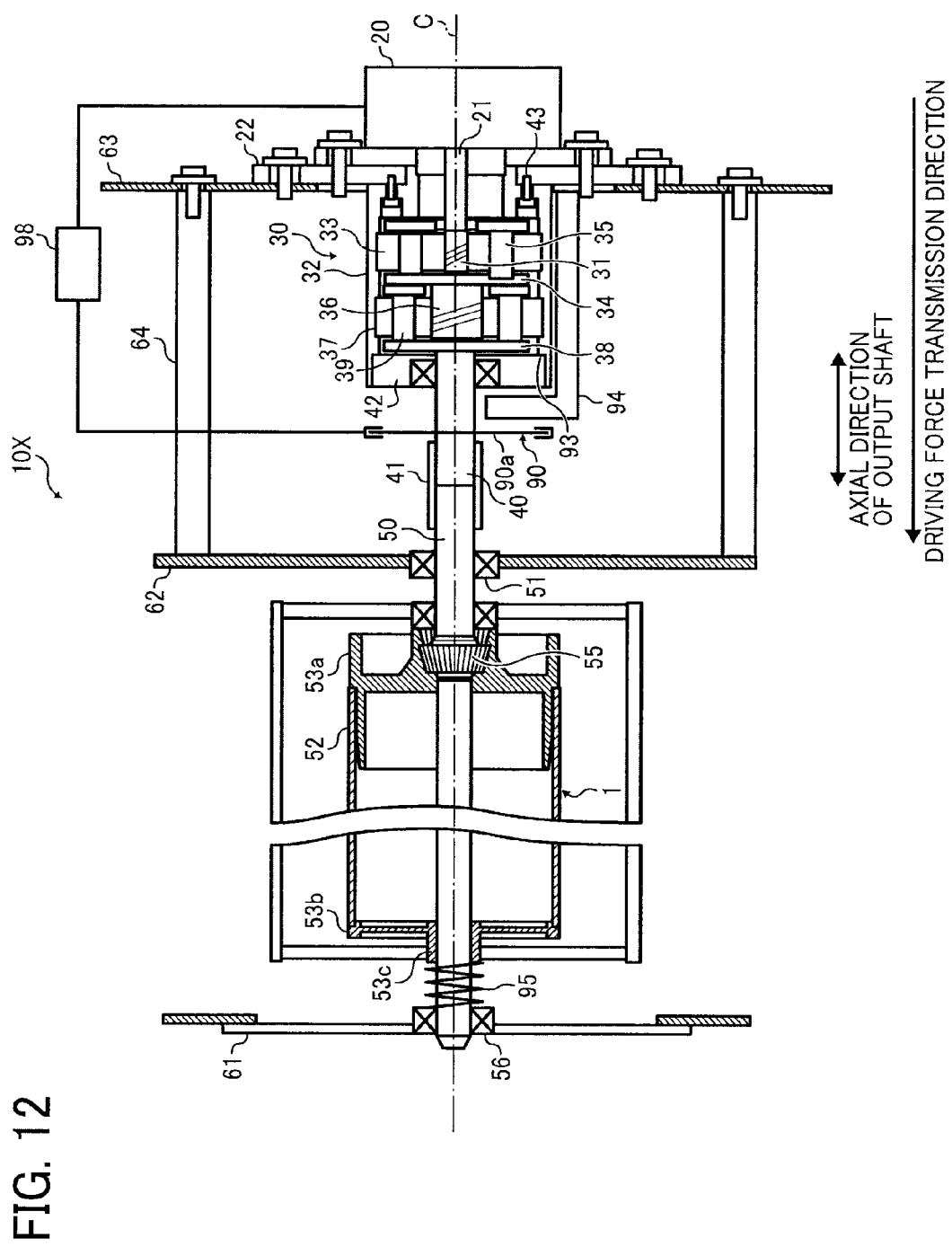
FIG. 12 is a vertical sectional view of a photoconductor driver according to a sixth exemplary embodiment installable in the image forming apparatus shown in FIG. 1.

With reference to FIG. 12, a description is provided of a configuration of a photoconductor driver 10X according to a sixth exemplary embodiment.

FIG. 12 is a vertical sectional view of the photoconductor driver 10X illustrating a configuration that regulates movement of the outer gear cap 42. The photoconductor driver 10X is different from the photoconductor driver 10W shown in FIG. 10 in that the photoconductor driver 10X incorporates a compression coil spring 95 in addition to the thrust regulator 94. The thrust regulator 94 regulates movement of the outer gear cap 42 of the planetary gear transmission 30 toward the photoconductor 1 in the direction parallel to the axial direction of the output shaft 40. Additionally, the compression coil spring 95 serving as a biasing member biases the outer gear cap 42 against the motor 20 in the direction parallel to the axial direction of the output shaft 40. Accordingly, the components of the photoconductor driver 10X shown in FIG. 12 that also appear in FIG. 11 are assigned with reference numerals identical to those shown in FIG. 11. The configuration, operation, and advantages of the photoconductor driver 10X that are equivalent to those of the photoconductor driver 10W are omitted.

Like in the photoconductor driver 10W shown in FIG. 10, in the photoconductor driver 10X, the thrust regulator 94 regulates movement of the outer gear cap 42 toward the photoconductor 1 in the direction parallel to the axial direction of the output shaft 40 without exerting stress on the outer gear 32. Even if the outer gear cap 42 moves toward the photoconductor 1, as the outer face of the outer gear cap 42 facing the photoconductor 1 comes into contact with the thrust regulator 94, the thrust regulator 94 halts the outer gear cap 42, thus regulating movement of the outer gear cap 42 toward the photoconductor 1. However, the axis of the photoconductor shaft 50 may deviate from the axis of the output shaft 40 of the planetary gear transmission 30. To address this circumstance, the thrust regulator 94 is spaced apart from the outer gear cap 42 with a predetermined interval therebetween to eliminate such deviation by self-aligning. Accordingly, the thrust regulator 94 spaced apart from the outer gear cap 42 may allow the outer gear cap 42 to loosely move toward the photoconductor 1 in the direction parallel to the axial direction of the output shaft 40 until it comes into contact with the thrust regulator 94. As the outer gear cap 42 loosely moves to the thrust regulator 94 while a toner image is formed on the photoconductor 1, the outer gear cap 42 may move the photoconductor shaft 50, degrading formation of the toner image on the photoconductor 1.

To address this problem, in a state in which any component of the photoconductor driver 10X or any peripheral component thereof is removed during assembly or maintenance of the photoconductor driver 10X, the thrust regulator 94 regulates movement of the outer gear cap 42 toward the photoconductor 1 in the direction parallel to the axial direction of the output shaft 40. Conversely, in a state in which the photoconductor 1 is connected to the photoconductor driver 10X to form a toner image on the photoconductor 1, the compression coil spring 95 biases the outer gear cap 42 against the motor 20, thus regulating movement of the outer gear cap 42 toward the photoconductor 1 in the direction parallel to the axial direction of the output shaft 40.

As described above, the photoconductor driver 10X includes the compressing coil spring 95 serving as a biasing member in addition to the thrust regulator 94.

A detailed description is now given of a configuration of the compression coil spring 95.

The compression coil spring 95, that is, an elastic body, is interposed between the bearing 56 mounted on the front support plate 61 fixedly provided inside the body 100 depicted in FIG. 1 and a boss 53c projecting from the drum flange 53b toward the front support plate 61. The bearing 56 is parallel to the axial direction of the output shaft 40. The compression coil spring 95 biases the outer gear cap 42 against the motor 20 through the photoconductor shaft 50 and the output shaft 40. Accordingly, when the photoconductor 1 is connected to the photoconductor driver 10X to form a toner image on the photoconductor 1, the outer gear cap 42 does not loosely move toward the photoconductor 1. Consequently, the outer gear cap 42 does not exert stress on the outer gear 32. At the same time, the compression coil spring 95 regulates movement of the outer gear cap 42 toward the photoconductor 1 in the direction parallel to the axial direction of the output shaft 40 without degrading formation of the toner image on the photoconductor 1. Hence, the photoconductor driver 10X drives and rotates the photoconductor 1 with enhanced precision.

With reference to FIGS. 3, 7 to 10, and 12, a description is provided of advantages of the photoconductor drivers 10, 10T, 10U, 10V, 10W, and 10X according to the first to sixth exemplary embodiments described above.

A rotary body driver (e.g., the photoconductor drivers 10, 10T, 10U, 10V, 10W, and 10X) includes a driving source (e.g., the motor 20), a planetary gear transmission (e.g., the planetary gear transmissions 30 and 30U), and a rotary body shaft (e.g., the photoconductor shaft 50). The planetary gear transmission includes a sun gear (e.g., the secondary sun gear 36), a plurality of planet gears (e.g., the secondary planet gears 37), a carrier (e.g., the secondary carrier 38), an outer gear (e.g., the outer gear 32), and an output shaft (e.g., the output shafts 40 and 40U). The driving source generates a driving force. The sun gear is rotatable by the driving force received from the driving source. The plurality of planet gears is arranged along an inner circumference of the outer gear with an identical interval between the adjacent planet gears in a circumferential direction of the outer gear and meshed with the sun gear and the outer gear. The rotatable carrier rotatably supports the plurality of planet gears. The rotary body shaft supports a rotary body (e.g., the photoconductor 1) and is connected to the output shaft of the planetary gear transmission, thus transmitting the driving force received from the output shaft to the rotary body. The outer gear is made of resin; the output shaft and the carrier combined with the output shaft are made of metal. Accordingly, the rotary body driver is lightweight and thereby saves resources. At the same time, the rotary body driver has an increased durability against load from the rotary body compared to a configuration in which all the major components of the planetary gear transmission are made of resin.

The rotary body shaft is rotatably supported by a bearing (e.g., the bearing 51) mounted on a support plate (e.g., the rear support plate 62) installed in an image forming apparatus (e.g., the image forming apparatus 500) in such a manner that the rotary body shaft is fixedly positioned in a radial direction thereof. The outer gear is elastically deformable in a radial direction thereof. Accordingly, even if the axis of the rotary body shaft deviates from the axis of the output shaft of the planetary gear transmission, the resin outer gear elastically deforms in the radial direction thereof, eliminating such deviation by self-aligning and therefore rotating the rotary body precisely.

The planet gears are made of resin and elastically deformable in a radial direction thereof. Accordingly, even if the axis of the rotary body shaft deviates from the axis of the output shaft of the planetary gear transmission, the resin planet gears elastically deform in the radial direction thereof, eliminating such deviation by self-aligning with decreased elastic deformation of the outer gear in the radial direction thereof and therefore improving durability of the rotary body driver.

The sun gear combined with the carrier is made of resin and elastically deformable in a radial direction thereof. Accordingly, even if the axis of the rotary body shaft deviates from the axis of the output shaft of the planetary gear transmission, the resin sun gear elastically deforms in the radial direction thereof, eliminating such deviation by self-aligning with further decreased elastic deformation of the outer gear in the radial direction thereof and therefore improving durability of the rotary body driver.

The planetary gear transmission further includes another set of the sun gear (e.g., the primary sun gear 31), the plurality of planet gears (e.g., the primary planet gears 33) meshed with the sun gear and the outer gear, and the carrier (e.g., the primary carrier 34). A driving shaft (e.g., the motor output shaft 21) of the driving source, the two sets of the sun gear and the carrier, the outer gear, the output shaft of the planetary gear transmission, the rotary body shaft of the rotary body, and the rotary body are coaxial. At least one of the carriers (e.g., the primary carrier 34 and the secondary carrier 38) is levitatably supported by the outer gear. Accordingly, concentric error between the levitatably supported carrier and the outer gear is minimized by self-aligning of the outer gear levitatably supporting the carrier, thus minimizing variation in the rotation speed of the rotary body.

The rotary body driver further includes a rotation speed detector (e.g., the rotation speed detector 90) incorporating a detected portion (e.g., the encoder disk 90*a*) disposed coaxial to the rotary body shaft of the rotary body or the output shaft of the planetary gear transmission to detect the rotation speed of the rotary body. The rotation speed detector is operatively connected to a controller (e.g., the controller 98) connected to the driving source. Accordingly, the controller controls the driving source by feedback control according to the rotation speed of the rotary body detected by the rotation speed detector, thus rotating the rotary body precisely.

The rotary body driver further includes a joint (e.g., the joints 41 and 41S) that couples the output shaft of the planetary gear transmission to the rotary body shaft of the rotary body. As shown in FIG. 7, the detected portion of the rotation speed detector is disposed downstream from the joint in the driving force transmission direction. Accordingly, even if the joint loosely couples the output shaft of the planetary gear transmission to the rotary body shaft of the rotary body, which may cause variation in the rotation speed of the rotary body, the rotation speed detector and the controller eliminate such variation by feedback control.

As shown in FIG. 8, the rotary body shaft of the rotary body and the output shaft of the planetary gear transmission form a single shaft. Accordingly, it is not necessary to couple the output shaft of the planetary gear transmission to the rotary body shaft of the rotary body with the joint, precluding loose coupling that may cause variation in the rotation speed of the rotary body.

The rotary body driver further includes a bracket (e.g., the bracket 22) to which the driving source and the planetary gear transmission are fastened. The bracket is anchored to the support plate (e.g., the rear support plate 62) through an anchor (e.g., the driver plate 63 and the stud 64) mounted on the support plate. Accordingly, the resin outer gear is cantilevered from the bracket mounting the driving source, increasing an amount of elastic deformation of the outer gear in the radial direction thereof. Even if the axis of the rotary body shaft of the rotary body deviates from the axis of the output shaft of the planetary gear transmission, the cantilevered, resin outer gear elastically deforms in the radial direction thereof in an increased amount, eliminating such deviation by self-aligning and therefore rotating the rotary body precisely.

As shown in FIG. 9, the bracket and the anchor are united into an aluminum die casting (e.g., the die casting 91) fastened to the support plate (e.g., the rear support plate 62). The driving source and the planetary gear transmission are fastened to the die casting with the screws. Accordingly, the die casting that supports the driving source and the planetary gear transmission has an increased rigidity and an increased resonance frequency that enhances a frequency band used by the encoder disk of the rotation speed detector for feedback control.

As shown in FIG. 10, the rotary body driver further includes an outer gear cap (e.g., the outer gear cap 42) attached to one end of the outer gear facing the rotary body to shield the carrier and the planet gears. The rotary body driver further includes a thrust regulator (e.g., the thrust regulator 94), separately provided from the outer gear, to regulate movement of the outer gear cap toward the rotary body in a direction parallel to an axial direction of the output shaft of the planetary gear transmission. The thrust regulator regulates movement of the outer gear cap in the direction parallel to the axial direction of the output shaft of the planetary gear transmission without exerting stress on the outer gear. Accordingly, even if the resin outer gear is deformed and causes periodic variation in the rotation speed of the rotary body, the thrust regulator minimizes such periodic variation in the rotation speed of the rotary body, thus rotating the rotary body precisely.

As shown in FIG. 12, the rotary body driver further includes a biasing member (e.g., the compression coil spring 95) that biases the outer gear cap against the driving source in the direction parallel to the axial direction of the output shaft of the planetary gear transmission. Accordingly, when a toner image is formed on the rotary body, the biasing member regulates movement of the outer gear cap toward the rotary body in the direction parallel to the axial direction of the output shaft of the planetary gear transmission without exerting stress on the outer gear and degrading quality of the toner image. Thus, the biasing member facilitates precise rotation of the rotary body.

As shown in FIG. 1, an image forming apparatus (e.g., the image forming apparatus 500) includes at least one rotary body (e.g., the photoconductors 1Y, 1M, 1C, and 1K and the support roller 12). At least one rotary body is connected to the rotary body driver described above. Accordingly, the image forming apparatus attains the advantages of the rotary body driver described above.

As shown in FIG. 1, the rotary body is an electrostatic latent image carrier (e.g., the photoconductors 1Y, 1M, 1C, and 1K) that carries an electrostatic latent image. The electrostatic latent image carrier is connected to the rotary body driver described above. Accordingly, the image forming apparatus minimizes formation of a faulty toner image caused by variation in the rotation speed of the electrostatic latent image carrier.

As shown in FIG. 1, the rotary body is a driving roller (e.g., the support roller 12) over which an intermediate transfer belt (e.g., the intermediate transfer belt 5) is stretched. Thus, the driving roller drives and rotates the intermediate transfer belt by friction therebetween. The driving roller is connected to the rotary body driver described above. Accordingly, the image forming apparatus minimizes formation of a faulty toner image caused by variation in the rotation speed of the intermediate transfer belt.

As described above, the outer gear and the planet gears of the planetary gear transmission are made of resin, achieving a light weight of the rotary body driver compared to a configuration in which the outer gear and the planet gears are made of metal, and thereby saving resources. Additionally, the output shaft and the carrier combined with the output shaft are made of metal, achieving an improved durability against a substantial load from the rotary body compared to a configuration in which all the major components of the planetary gear transmission are made of resin.

The present invention has been described above with reference to specific exemplary embodiments. Note that the present invention is not limited to the details of the embodiments described above, but various modifications and enhancements are possible without departing from the spirit and scope of the invention. It is therefore to be understood that the present invention may be practiced otherwise than as specifically described herein. For example, elements and/or features of different illustrative exemplary embodiments may be combined with each other and/or substituted for each other within the scope of the present invention.

What is claimed is:

1. A rotary body driver for driving a rotary body, the rotary body driver comprising:
    a driving source to generate a driving force;
    a planetary gear transmission connected to the driving source to receive the driving force therefrom and including:
    a sun gear rotatable by the driving force received from the driving source;
    a plurality of planet gears meshed with and surrounding the sun gear with an identical interval between the adjacent planet gears;
    a rotatable carrier to rotatably support the plurality of planet gears;
    an outer gear encircling and meshed with the plurality of planet gears; and
    an output shaft combined with and supporting the carrier;
    a rotary body shaft mounting the rotary body and connected to the output shaft of the planetary gear transmission to transmit the driving force received from the output shaft to the rotary body;
    a rotation speed detector including a detected portion disposed coaxial to the rotary body shaft of the rotary body or the output shaft of the planetary gear transmission to detect a rotation speed of the rotary body;
    a hollow cylindrical joint fitted onto the rotary body shaft of the rotary body to couple the output shaft of the planetary gear transmission to the rotary body shaft of the rotary body; and
    a screw to fasten the joint to the output shaft of the planetary gear transmission,
    wherein the detected portion of the rotation speed detector is disposed downstream from the joint in a driving force transmission direction,
    wherein the joint has a slit extending from a center to a circumferential edge thereof facing the output shaft of the planetary gear transmission in an axial direction of the rotary body shaft of the rotary body, and
    wherein the outer gear is made of resin and the output shaft and the carrier are made of metal.

2. The rotary body driver according to claim 1, wherein the rotary body shaft is rotatably supported by a bearing mounted on a support plate that houses the rotary body in such a manner that the rotary body shaft is fixedly positioned in a radial direction thereof and the outer gear is elastically deformable in a radial direction thereof.

3. The rotary body driver according to claim 2, wherein the plurality of planet gears is made of resin and elastically deformable in a radial direction thereof.

4. The rotary body driver according to claim 3, wherein the sun gear is combined with the carrier and is made of resin elastically deformable in a radial direction thereof.

5. The rotary body driver according to claim 1, wherein the planetary gear transmission further includes another set of the sun gear, the plurality of planet gears, and the carrier and the driving source includes a driving shaft connected to the planetary gear transmission,
    wherein the driving shaft of the driving source, the sun gears, the carriers, the outer gear, and the output shaft of the planetary gear transmission, the rotary body shaft of the rotary body, and the rotary body are coaxial, and
    wherein at least one carrier is supported by the outer gear.

6. The rotary body driver according to claim 1, further comprising a hinge screw to fasten the joint to the output shaft of the planetary gear transmission.

7. The rotary body driver according to claim 1, wherein the rotary body shaft of the rotary body and the output shaft of the planetary gear transmission form a single shaft.

8. A rotary body driver comprising:
    a driving source to generate a driving force;
    a planetary gear transmission connected to the driving source to receive the driving force therefrom and including:
    a sun gear rotatable by the driving force received from the driving source;

a plurality of planet gears meshed with and surrounding the sun gear with an identical interval between the adjacent planet gears;
a rotatable carrier to rotatably support the plurality of planet gears;
an outer gear encircling and meshed with the plurality of planet gears;
an output shaft combined with and supporting the carrier;
a rotary body shaft mounting the rotary body and connected to the output shaft of the planetary gear transmission to transmit the driving force received from the output shaft to the rotary body;
a bracket to which the driving source and the planetary gear transmission are fastened; and
an anchor mounted on the support plate, through which the bracket is anchored to the support plate,
wherein the rotary body shaft is rotatably supported by a bearing mounted on a support plate that houses the rotary body in such a manner that the rotary body shaft is fixedly positioned in a radial direction thereof and the outer gear is elastically deformable in a radial direction thereof.

9. A rotary body driver comprising:
a driving source to generate a driving force;
a planetary gear transmission connected to the driving source to receive the driving force therefrom and including:
a sun gear rotatable by the driving force received from the driving source;
a plurality of planet gears meshed with and surrounding the sun gear with an identical interval between the adjacent planet gears;
a rotatable carrier to rotatably support the plurality of planet gears;
an outer gear encircling and meshed with the plurality of planet gears;
an output shaft combined with and supporting the carrier;
a rotary body shaft mounting the rotary body and connected to the output shaft of the planetary gear transmission to transmit the driving force received from the output shaft to the rotary body; and
an aluminum die casting fastened to the support plate,
wherein the rotary body shaft is rotatably supported by a bearing mounted on a support plate that houses the rotary body in such a manner that the rotary body shaft is fixedly positioned in a radial direction thereof and the outer gear is elastically deformable in a radial direction thereof.

10. A rotary body driver comprising:
a driving source to generate a driving force;
a planetary gear transmission connected to the driving source to receive the driving force therefrom and including:
a sun gear rotatable by the driving force received from the driving source;
a plurality of planet gears meshed with and surrounding the sun gear with an identical interval between the adjacent planet gears;
a rotatable carrier to rotatably support the plurality of planet gears;
an outer gear encircling and meshed with the plurality of planet gears;
an output shaft combined with and supporting the carrier;
a rotary body shaft mounting the rotary body and connected to the output shaft of the planetary gear transmission to transmit the driving force received from the output shaft to the rotary body;
an outer gear cap attached to one end of the outer gear facing the rotary body to shield the carrier and the plurality of planet gears; and
a thrust regulator, separately provided from the outer gear, to regulate movement of the outer gear cap toward the rotary body in a direction parallel to an axial direction of the output shaft of the planetary gear transmission.

11. The rotary body driver according to claim 10, further comprising a biasing member to bias the outer gear cap against the driving source in the direction parallel to the axial direction of the output shaft of the planetary gear transmission.

12. An image forming apparatus comprising:
at least one rotary body; and
the rotary body driver according to claim 1, connected to the at least one rotary body to rotate the at least one rotary body.

13. The image forming apparatus according to claim 12, wherein the at least one rotary body includes an electrostatic latent image carrier to carry an electrostatic latent image.

14. The image forming apparatus according to claim 12, further comprising an intermediate transfer belt to carry a toner image,
wherein the at least one rotary body includes a driving roller contacting the intermediate transfer belt to rotate the intermediate transfer belt by friction therebetween.

* * * * *